(12) United States Patent
Kirihara et al.

(10) Patent No.: US 7,298,863 B2
(45) Date of Patent: Nov. 20, 2007

(54) IN-VEHICLE SPEAKER ROTATIONAL MOUNTING STRUCTURE

(75) Inventors: Karebu Kirihara, Okazaki (JP); Taizo Nakamura, Okazaki (JP)

(73) Assignees: Mitsubishi Jidosha Kogyo Kabushiki Kaisha (JP); Mitsubishi Jidosha Engineering Kabushiki Kaisha (JP)

( * ) Notice: Subject to any disclaimer, the term of this patent is extended or adjusted under 35 U.S.C. 154(b) by 981 days.

(21) Appl. No.: 10/462,566

(22) Filed: Jun. 16, 2003

(65) Prior Publication Data

US 2004/0037445 A1 Feb. 26, 2004

(30) Foreign Application Priority Data

Jun. 17, 2002 (JP) ............................. 2002-176364

(51) Int. Cl.
*H04R 1/02* (2006.01)

(52) U.S. Cl. .......................... 381/389; 381/86; 381/87; 381/302

(58) Field of Classification Search .................. 381/86, 381/386, 389, 332, 334, 387, 395, 87, 302, 381/1

See application file for complete search history.

(56) References Cited

U.S. PATENT DOCUMENTS 5,867,583 A * 2/1999 Hazelwood et al. ........ 381/395

6,588,543 B1 * 7/2003 Tchilinguirian ............. 181/150
6,876,752 B1 * 4/2005 Guenther .................... 381/386
6,876,753 B2 * 4/2005 Kim .......................... 381/386

FOREIGN PATENT DOCUMENTS

| JP | 06-022013 A | 1/1994 |
| JP | 2001-169374 A | 6/2001 |
| JP | 2003-153362 A | 5/2003 |

OTHER PUBLICATIONS

Relevant portion of Chinese Office Action of corresponding Chinese Application Filing No. 03141044.8.
Office Action issued in the corresponding Chinese application No.: 03141044.8, mailed on Aug. 3, 2007.

* cited by examiner

*Primary Examiner*—Vivian Chin
*Assistant Examiner*—Con P. Tran
(74) *Attorney, Agent, or Firm*—Rossi, Kimms & McDowell LLP

(57) ABSTRACT

An in-vehicle speaker rotational mounting structure including a speaker unit having a claw portion provided thereon, and a panel member on which the speaker unit is mounted, wherein the claw portion is inserted into a slit formed in the panel member, so that the speaker unit is mounted on the panel member by being rotated in a circumferential direction. A jig inserting hole is provided in the speaker unit.

14 Claims, 25 Drawing Sheets

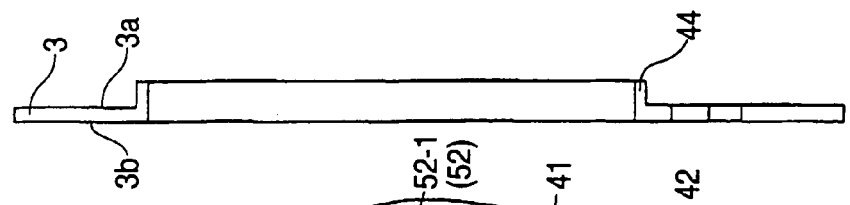
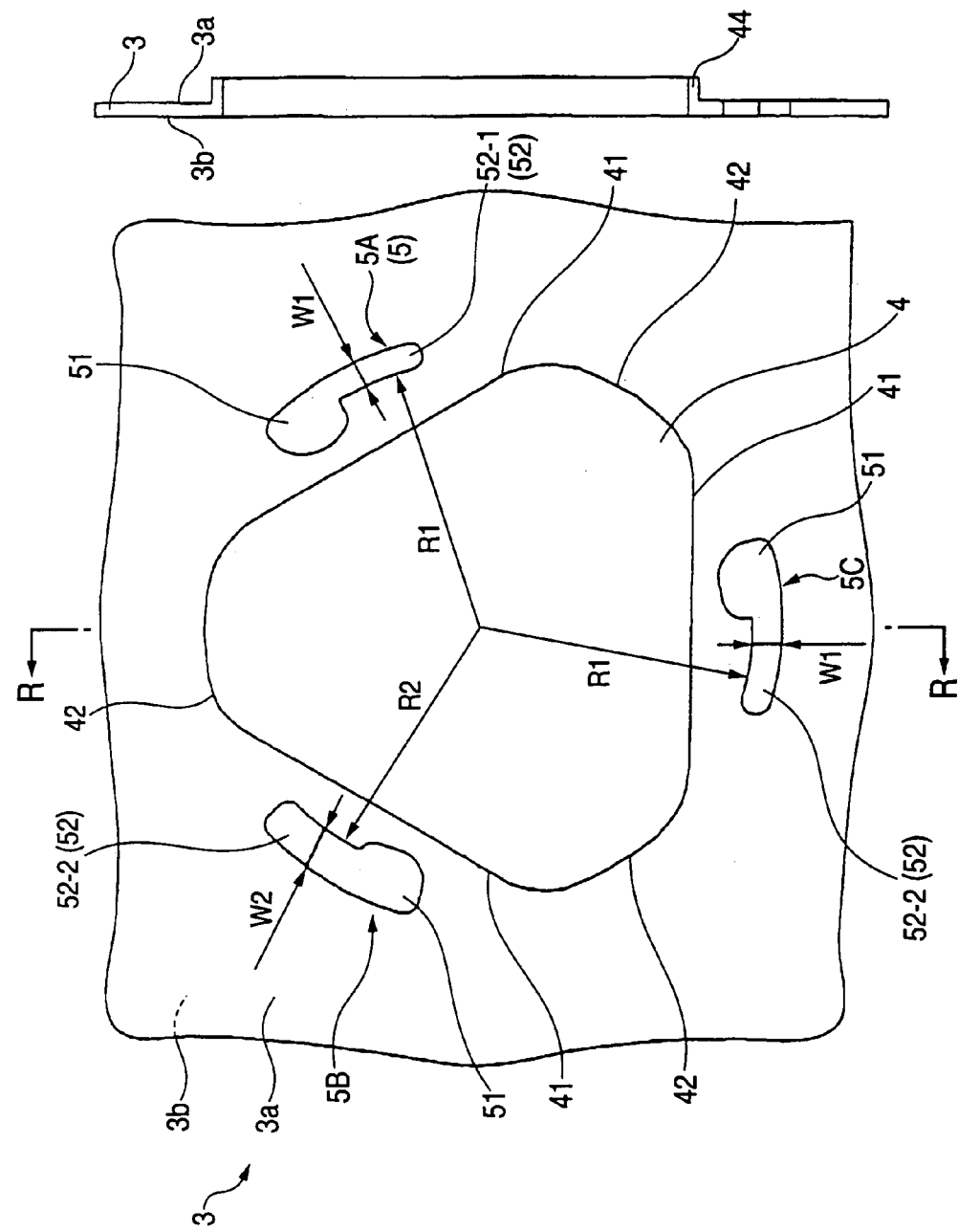

PRIOR ART

PRIOR ART

PRIOR ART

IN-VEHICLE SPEAKER ROTATIONAL MOUNTING STRUCTURE

BACKGROUND OF THE INVENTION

1. Field of the Invention

The present invention relates to an in-vehicle speaker mounting structure for mounting a speaker on a vehicle such as an automobile.

2. Description of the Related Art

Conventionally, speakers for outputting sound reproduced by an in-vehicle audio system represented by such as an in-vehicle radio and an in-vehicle CD player are mounted on doors and/or a rear parcel shelf inside the passenger compartment of an automobile. A general mounting structure for mounting such speakers on an automobile will be described below with reference to FIG. 22.

FIG. 22 illustrates an example of a conventional in-vehicle speaker mounting structure and shows a case where a speaker unit 120 is mounted on a door panel 104 of an automobile. An opening 105 is formed in the door panel 104 for mounting the speaker unit 120 thereon, and four set holes 119 are formed around this opening 105.

A grommet 102 into which a screw 103 is screwed is fit in each set hole 119.

When mounting this speaker unit 120 on the door panel 104 (hereinafter, this work is also referred to simply as "mounting work"), an operator aligns screw holes 120a formed in the speaker unit 120 with the grommets 102 installed in the set holes 119, and passes screws 103 through the screw holes 120a for screwing into the grommets 102 while holding a state in which the speaker unit 120 is disposed in the opening 105.

According to the conventional in-vehicle speaker mounting structure, troublesome and complicated operations are needed to mount the speakers on the vehicle body, resulting in an increase in man-hours for operations.

There have been proposed in-vehicle speaker rotational mounting structures, and one example is disclosed in JP-A-2001-169374.

In the technique disclosed in the JP-A-2001-169374, a speaker unit 101 is fixed to a speaker unit mounting plate 160 as shown in FIG. 23. Namely, when mounting the speaker unit 101 on the speaker unit mounting plate 160, the speaker unit 101 is inserted into a mounting opening 170 from a front side of the speaker unit mounting plate 160. As this occurs, engagement pieces 140 protruding from a plurality of locations on a rear side of the speaker unit 101 and an abutment piece 150 also protruding from a single location on the rear side of the speaker unit 101 are inserted into engagement piece inserting cut-outs 180a and an abutment piece inserting cut-out 190a which are all formed in the speaker unit mounting plate 160, respectively.

Then, in this state, the speaker unit 101 is rotated in a direction indicated by an arrow Z. As a result, the respective engagement pieces 140 are guided along inclined portions 180b for engagement with engagement piece engagement portions 180c, respectively, whereby the speaker unit 101 is fixed to the speaker unit mounting plate 160.

In addition, as a result of the rotation of the speaker unit 101 in the direction indicated by the arrow Z, the abutment piece 150 moves from the abutment piece inserting cut-out 190a to an abutment piece locking cut-out 190b for engagement therewith via a locking portion 190c which is a stepped portion. Thus, even when the speaker unit is attempted to be rotated in a reverse direction (a direction reverse to the direction indicated by the arrow Z), the abutment piece 150 comes into abutment with the locking portion 190c to thereby prohibit the reverse rotation of the speaker unit 101.

With the rotational-mount type speaker disclosed in the JP-A-2001-169374, however, in order to prevent the ingress of rain water and/or dust into the interior of the speaker unit 101 and an inner part of a door panel 201 from a gap between the speaker unit 101 and the door panel 201, a tight adhesion needs to be provided between the speaker unit 101 and the door panel 201 to provide waterproof and dust proof functions. This requires a strong torque to be applied to the speaker unit 101 when the speaker is mounted on the vehicle body.

In this case, although it is not impossible for workers to manually rotate the speaker unit 101, on production lines for mass production, speaker units 101 have to be mounted on a number of automobiles, and this has caused a problem that the manual mounting work of speakers forces the workers to bear tremendously excessive work load.

SUMMARY OF THE INVENTION

The invention was made in view of the problem and an object of the invention is to provide an in-vehicle speaker mounting structure which can provide good workability at the time of mounting.

According to a first aspect of the invention, there is provided an in-vehicle speaker rotational mounting structure including: a speaker unit having a claw portion and a jig inserting hole; and a panel member on which the speaker unit is mounted, the panel member having a slit, wherein the claw portion is inserted into the slit and the speaker unit is rotated in a circumferential direction so as to mount the speaker unit on the panel member.

According to this construction, the speaker housing can be rotated with a large magnitude of force by inserting a screwdriver, which is a general tool, into the jig inserting hole and applying a small magnitude of force to the tool so inserted.

BRIEF DESCRIPTION OF THE DRAWINGS

FIG. 6A is a schematic elevational view showing the panel member of the in-vehicle speaker rotational mounting structure, and FIG. 6B is a sectional view taken along line R-R in FIG. 6A;

DETAILED DESCRIPTION OF THE PREFERRED EMBODIMENTS

An in-vehicle speaker rotational mounting structure according to an embodiment of the invention will be described below with reference to the accompanying drawings.

Figure 1:
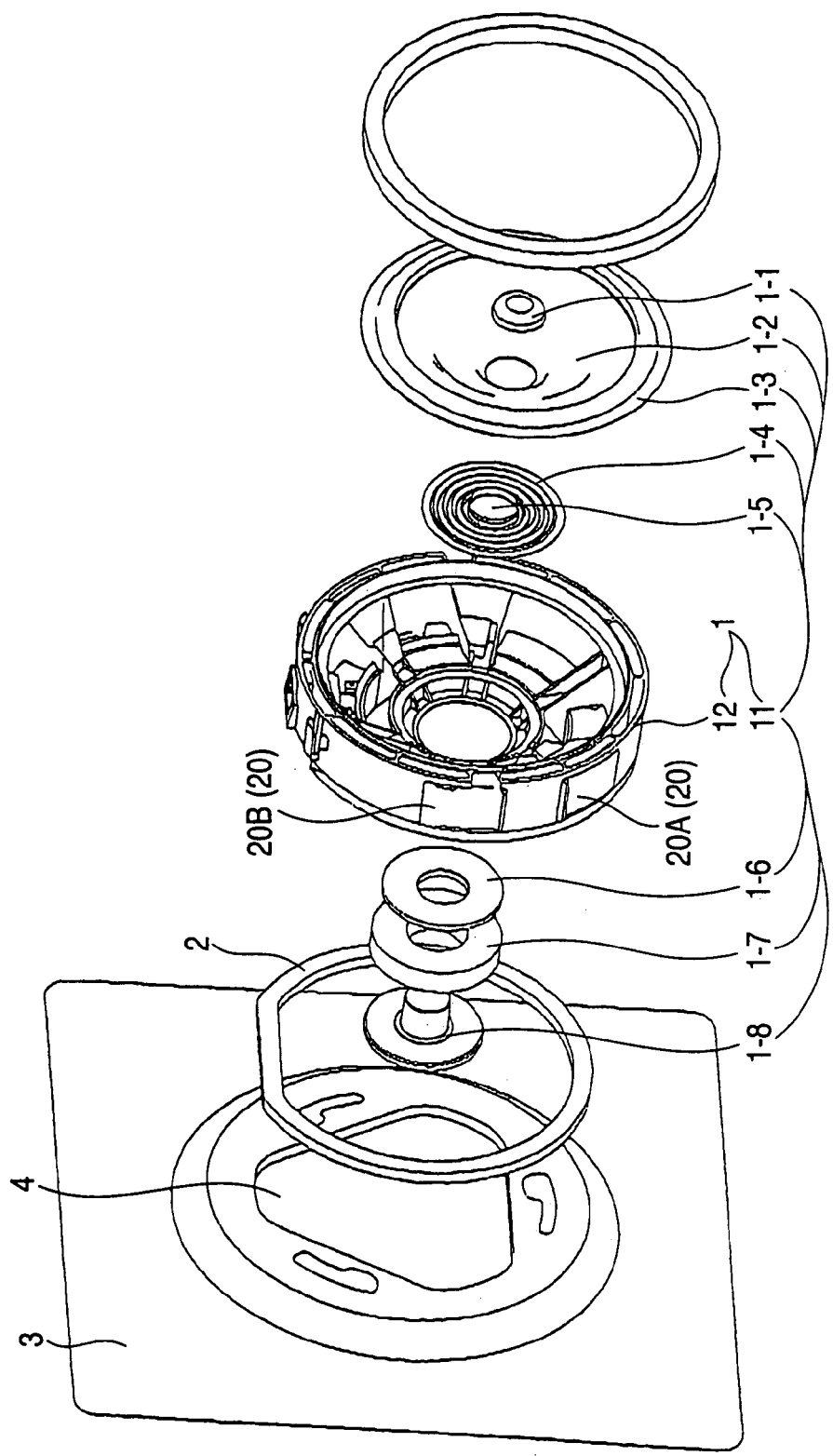
FIG. 1 is a schematic exploded perspective view showing a main construction of an in-vehicle speaker rotational mounting structure according to an embodiment of the invention.
Figure 2:
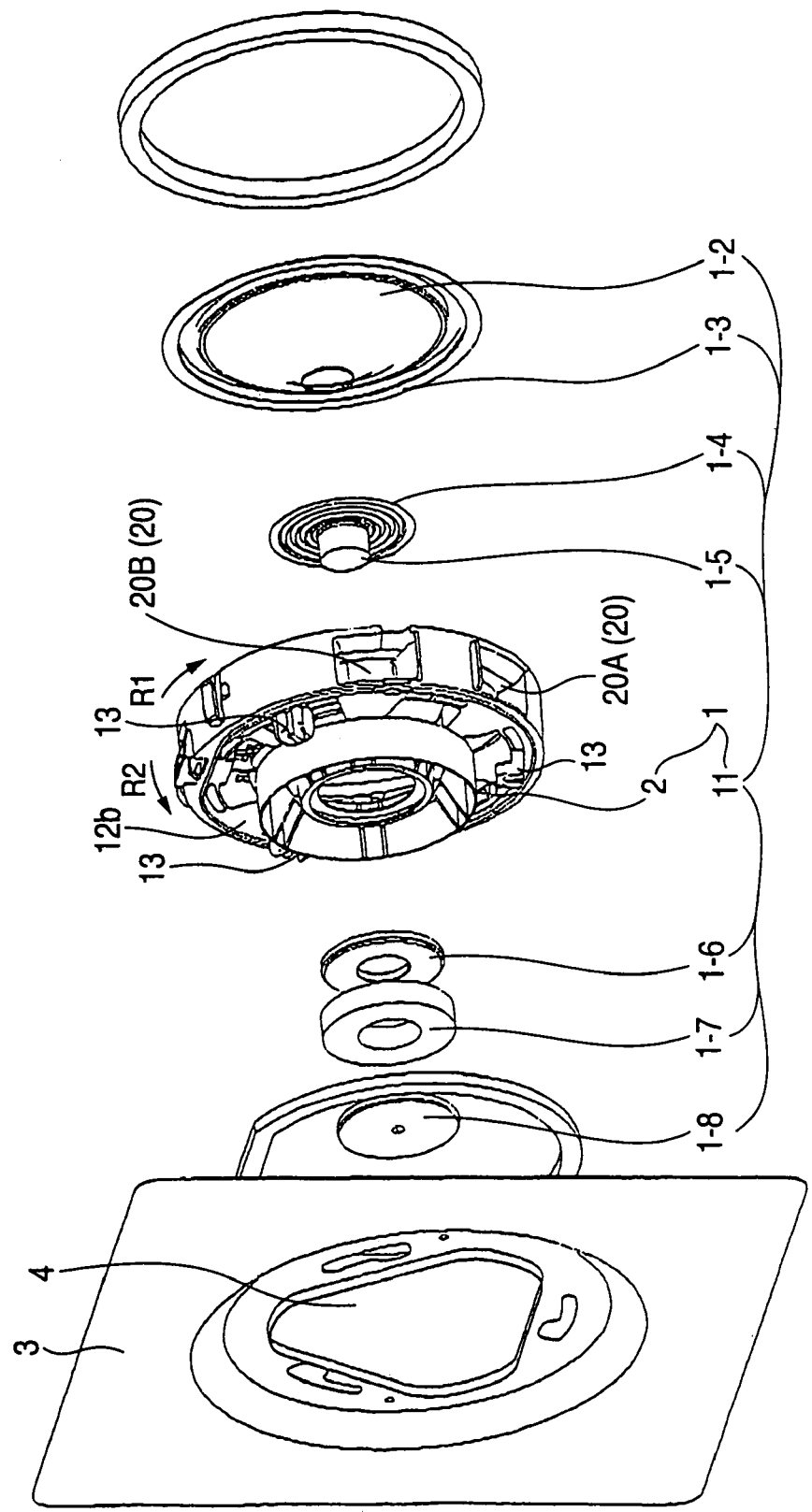
FIG. 2 is a schematic exploded perspective view showing the main construction of the in-vehicle speaker rotational mounting structure.
Figure 3:
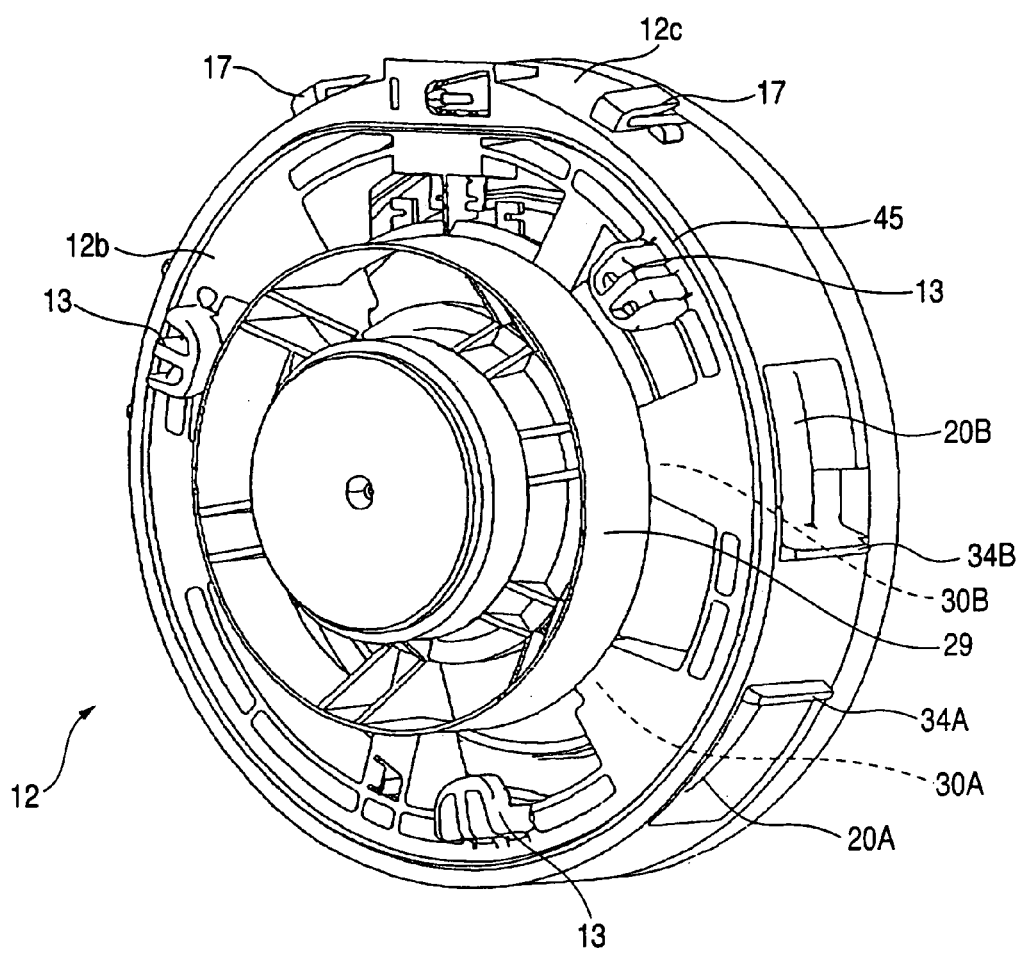
FIG. 3 is a schematic perspective view showing a rear side of a speaker housing in the in-vehicle speaker rotational mounting structure.
Figure 4:
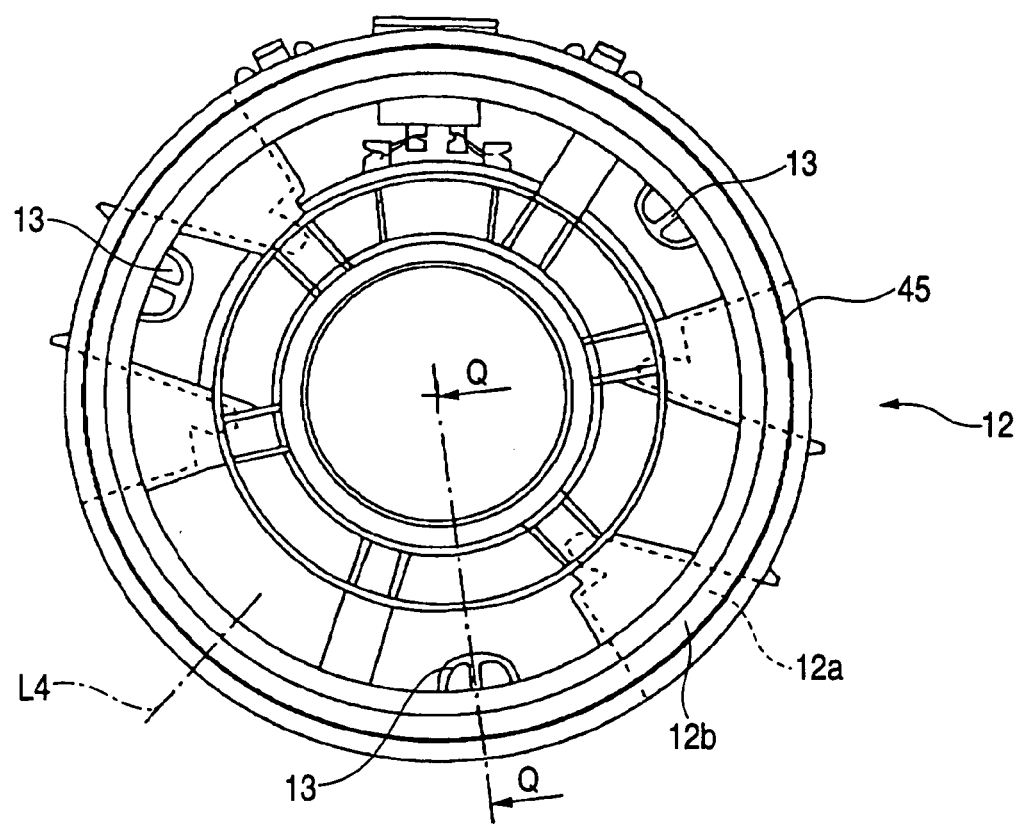
FIG. 4 is a schematic elevational view showing the rear side of the speaker housing in the in-vehicle speaker rotational mounting structure.
Figure 5:
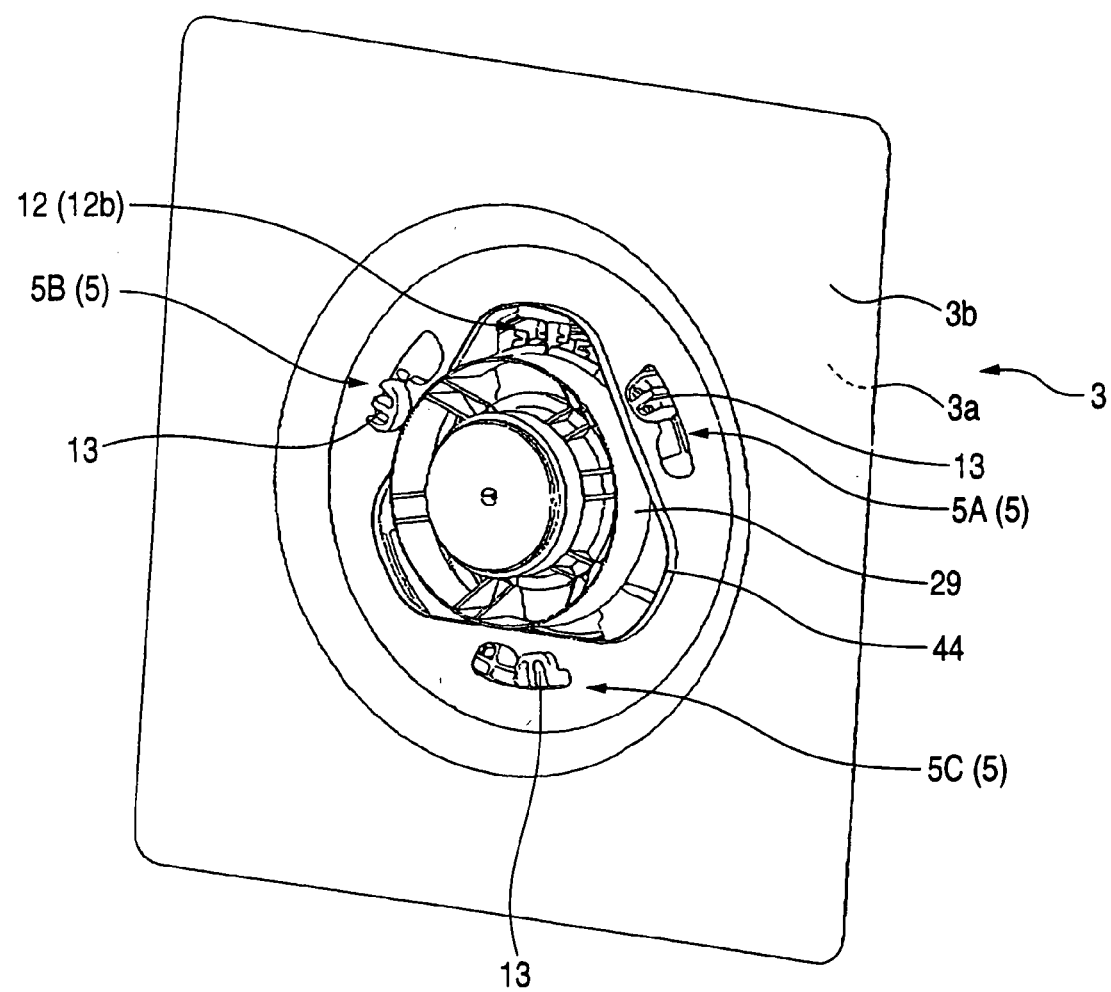
FIG. 5 is a schematic perspective view showing a state in which the speaker housing is mounted on a panel member in the in-vehicle speaker rotational mounting structure.
Figure 7:
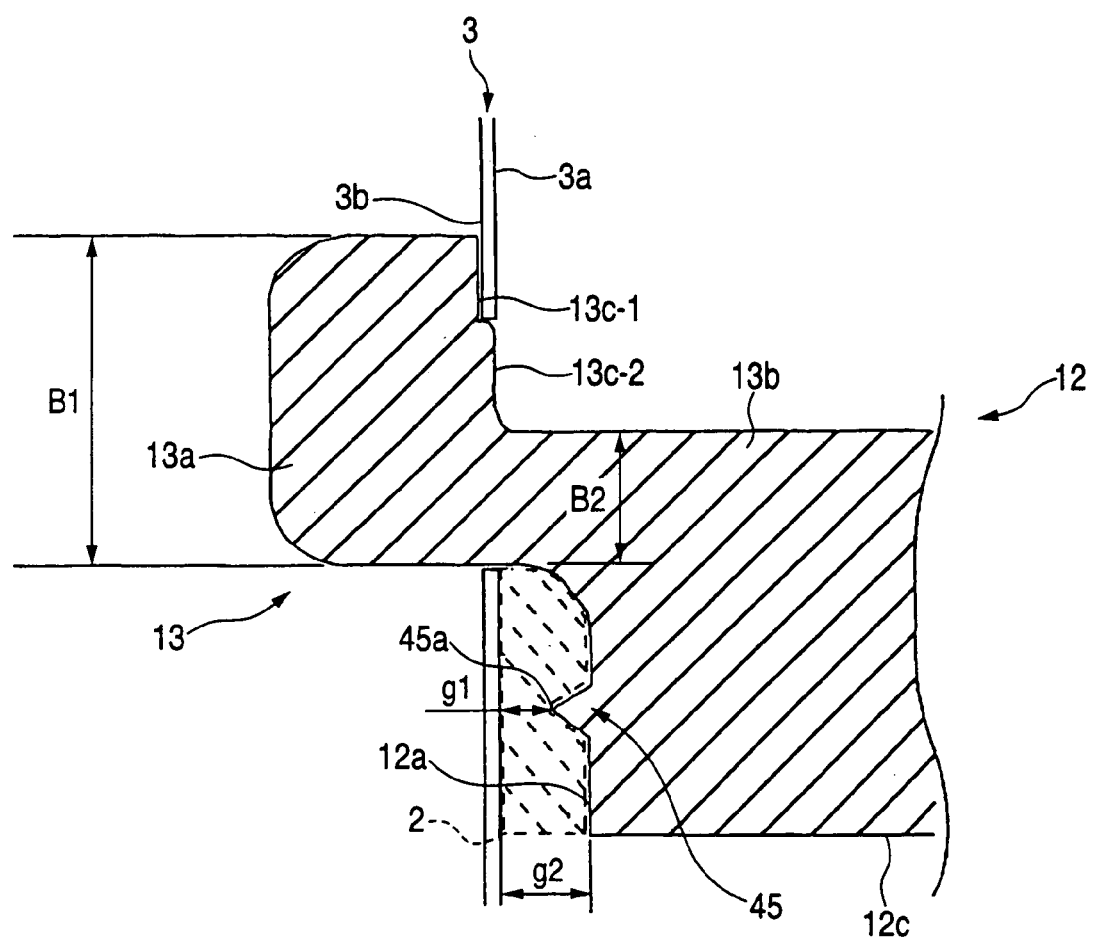
FIG. 7 is a schematic cross-sectional view taken along the line Q-Q in FIG. 4 and showing the speaker housing and the panel member of the in-vehicle speaker rotational mounting structure.

FIGS. 1 and 2 are schematic exploded perspective views showing main constructions of the in-vehicle speaker rotational mounting structure according to the embodiment of the invention, FIG. 3 is a schematic perspective view showing a speaker housing, FIG. 4 is a schematic elevation of a rear side of the speaker housing shown in FIG. 3, FIG. 5 is a schematic perspective view showing a state in which the speaker housing is mounted on a panel member, FIGS. 6A and 6B show a schematic elevation of a rear side of the panel member and a cross section thereof, and FIG. 7 is a schematic cross section showing cross sections of the speaker housing and the panel member, which is a cross section taken along the line Q-Q in FIG. 4.

As shown in FIGS. 1 and 2, a speaker unit (a rotational-mount type speaker unit) 1 mainly includes a speaker main body 11, and a speaker housing (hereinafter, also referred to simply as a "housing") 12 adapted for holding the speaker main body 11.

This speaker main body 11 includes a cap 1-1, a cone (a vibration plate) 1-2, an edge 1-3, a damper 1-4, a voice coil 1-5, a plate 1-6, a magnet 1-7 and a yoke 1-8. These components constituting the speaker main body 11 are generally known and therefore the description thereof will be omitted.

In this embodiment, the housing 12 is integrally molded from a resin, and as shown in FIGS. 2 and 5, three claw portions 13 are provided on a rear side 12b of the housing 12 for fixing the speaker unit 1 to a door inner panel 3.

As shown in FIGS. 1 and 2, a substantially triangular opening 4 is formed in the door inner panel 3 on which the speaker unit 1 is mounted, and three slits 5 are formed around the perimeter of the opening 4 at positions corresponding to the claw portions 13. The claw portions 13 and the slits 5 are formed at intervals of 120 degrees relative to the center of the speaker unit 1.

When mounting the speaker unit 1 on the door inner panel 3, firstly, the respective claw portions 13 on the housing 12 are inserted into the slits 5, and thereafter, the housing 12 is rotated in a clockwise direction (a direction indicated by an arrow R2 in FIG. 2) as viewed from a front side 12a of the housing 12, whereby the housing 12 of the speaker unit 1 is fixed to the door inner panel 13, as shown in FIG. 5.

To described in more detail, as shown in FIGS. 1 and 2, the opening 4 is formed into a substantially triangular shape which is smaller than an outside diameter of the speaker housing 12. As shown in FIG. 6A, this opening 4 has three straight sides 41, and the substantially triangular opening is formed by connecting ends of the respective straight sides 41 via curves (for example, arcs) 42. A reason why the opening 4 is formed into the substantially triangular shape will be described later.

As shown in FIG. 6B, a flange 44 is formed on the periphery of the opening 4 by bending an edge portion of the opening 4 substantially at right angles. The rigidity of the opening 44 is attempted to be increased by this flange 44.

Additionally, a first slit 5A, a second slit 5B and a third slit 5C are disposed around an outer circumference of the substantially triangular opening 4 in the vicinity of the three straight portions 41 thereof. Note that these first slit 5A, second slit 5B and third slit 5C may be described as the "slit 5" when they are designated collectively.

As shown in FIG. 7, a distal end 13a of the claw portion 13 is bent toward the center of the speaker unit 1. The claw portion 13 includes the distal end 13a and an arm portion 13b which connects the distal end 13a with the housing 12. The claw portion 13 is formed such that the cross section thereof becomes a substantially L shape and that the width B1 of the distal end 13a is greater than the width B2 of the arm portion 13b.

The slit 5 into which the claw portion 13 is inserted includes, as shown in FIG. 6A, an inserting portion 51 through which the distal end 13a of the claw portion 13 is allowed to pass and a fixing portion 52 which communicates with the inserting portion 51 and through which only the arm portion 13b is allowed to pass.

When work for mounting the speaker unit on the door inner panel 3 (hereinafter, also referred to simply as "mounting work") is carried out, firstly the distal end 13a of the claw portion 13 is inserted into the inserting portion 51, and thereafter, the housing 12 is rotated clockwise so that the arm portion 13b is caused to slide into the fixing portion 52. Thus, the speaker unit 1 is firmly mounted on the door inner panel 3 through engagement of the claw portion 13 with the slit 5.

To describe this by taking the first slit 5A for example, since the width W1 of a gap of the fixing portion 52-1 is made to be a minimum width required for the passage of the arm portion 13b having the width B2, the distal end 13a having the width B1 which is wider than the width B2 of the arm portion 13b is not allowed to pass through the gap of the fixing portion 52-1 whose width is W1. Namely, even if the speaker unit 1 is attempted to be pulled out with the arm portion 13b having been moved into the fixing portion 52-1, the distal end 13a of the claw portion 13 is not allowed to pass through the gap having the width W1 of the fixing portion 52-1. Consequently, the housing 12 of the speaker unit 1 is fixed in a vertical direction relative to the door inner panel 3.

In the embodiment, the claw portion 13 and a rear side 3b of the door inner panel 3 are constructed to be brought into press contact with each other by a restoring force of a lower cushion 2 (which will be described later) shown in FIGS. 1, 2 and 7, whereby the speaker unit 1 can be fixed firmly not only in the vertical direction but also in a circumferential direction.

In this construction, however, in the event that the door inner panel 3 expands or contracts due to change in temperature, contact surfaces of the claw portion 13 and the door inner panel 3 are caused to rub against each other, and as a result, a squeak might be generated.

Similarly, when vibrations and impacts generated when the vehicle is running are transmitted to the door inner panel 3, the contact surfaces of the claw portion 13 and the door inner panel 3 might cause to rub against each other to thereby generate a squeak.

In particular, the cone 1-2 of the speaker main body 11 echoes with a squeak so generated, and the squeak is then transmitted to the interior of the passenger compartment to thereby make passengers in the passenger compartment feel uncomfortable. Thus, there is caused a problem of how to reduce or eliminate the squeak.

In order to reduce or eliminate a squeak, it is effective to reduce a friction force generated between the claw portion 13 and the rear side 3b of the door inner pane 3. On the other hand, as has been described above, in order to firmly mount the speaker unit 1 on the door inner panel 3 by bringing into a strong press contact with the rear side 3b of the door inner panel 3, a friction force required for this purpose needs to be left.

Figure 8:
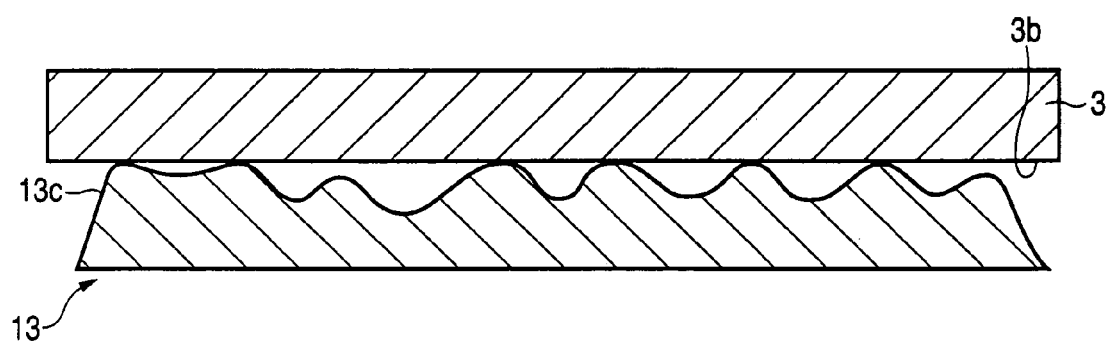
FIG. 8 is a schematic sectional view showing contact surfaces of the speaker housing and the panel member of the in-vehicle speaker rotational mounting structure.

Thus, in this embodiment, irregularities are formed on a surface 13c of the claw portion 13 which is brought into contact with the rear side 3b of the door inner panel 3 so as to reduce the contact area of the rear side 3b of the door inner panel 3 with the surface 13c of the claw portion 13, whereby a desired amount of friction force is reduced. A concept of this idea is schematicly shown in FIG. 8. Namely, in the event that minute irregularities are formed on the surface 13b of the claw portion 13, the contact area between the surface 13c of the claw portion 13 and the rear side 3b of the door inner panel 3 is reduced, and in the event that the door inner panel 3 expands or contracts due to a change in temperature, or in the event that vibrations and impacts generated while the vehicle is running are transmitted to the door inner panel 3, the surface 13c of the claw portion 13 slides on the rear side 3b of the door inner panel 3 appropriately, thereby making it possible to reduce or eliminate the generation of a squeak. In addition, since the irregularities so formed are minute, there is caused no risk that the contact area is reduced more than required, thereby making it possible to eliminate a risk that the friction force is lost which is required to firmly mount the speaker unit 1 on the door inner panel 3.

Note that while the construction is adopted in this embodiment in which the irregularities are formed on the surface 13c of the claw portion 13, another construction may be adopted in which the irregularities are formed on the rear side 3b of the door inner panel 3. Namely, the irregularities may only have to be formed on at least either the surface 13c of the claw portion 13 which is brought into abutment with the door inner panel 3 or the side 3b of the door inner panel 3 which is brought into abutment with the claw portion 13.

To form the minute irregularities, an grain finish process is effective which is a processing method for forming a cloth mark effect or a wood grain effect on the surface of a resin or metallic molded piece. In addition, as another method, an etching process is also an effective processing method in which the surface of a resin or a metal is chemically or electrically etched to form minute irregularities thereon.

As shown in FIG. 3, clips 17 are formed on an outer circumferential surface 12c of the housing 12 for holding or fixing a cable (not shown) for supplying power to the speaker unit 1 or a cable (not shown) for transmitting a speech signal to the speaker unit 1.

The clip 17 is fixed to the outer circumference of the housing at one end (a proximal end) thereof, and the other end thereof is constructed as an open end (a distal end). In addition, the distal end of the clip 17 is formed into a wedge shape. Thus, a cable can easily be inserted between the clips 17 and the outer circumference of the housing 12 by providing the clips 17 so constructed, thereby making it possible to fix the cable securely. In addition, there is no risk that the cable is caused to flutter after installation, thereby making it possible to firmly prevent the interference of the cable with other components.

The reason why the opening 4 is formed not circular but triangular will be described.

An object of the formation of the triangular opening is to approach the claw portions 13 to the flange 44 as close as possible.

This is because the surface strength becomes high in the vicinity of the flange 44, and because the surface strength is deteriorated as it goes farther away from the flange 44.

In the event that the opening 4 is circular, however, there is a limitation on a processing technique for approaching the entirety of the slits 5 to a general flange which is provided along the circular opening, and since the general flange and the slits have to be spaced apart by a slight distance from each other, the mounting rigidity of a speaker has not been able to be enhanced sufficiently. In addition, while it would have been possible to devise a countermeasure in which the required surface strength for a panel member is ensured by making the open area of the opening smaller, there has been a demand that the opening area be made as large as possible in consideration of the acoustic properties of the speaker.

Namely, in the event that the opening 4 is circular, the rotational locus of the claw portions 13 on the housing 13 and the outer circumference of the circular opening of the circle become concentric with each other, and the rotational locus of the claw portions 13 and an edge portion of the circular opening become parallel with each other. Thus, no matter how the housing 12 is rotated, there is no possibility that the claw portions 13 are allowed to approach the opening.

In this embodiment, however, since the opening 4 is formed into the substantially triangular shape, an imaginary line which is an extension from the rotational locus of the claw portions 13 intersects with the opening 4. In other words, when the housing 12 is rotated, the claw portions 13 approach the flange 44 provided along the edge portion of the opening 4.

In this embodiment, the inserting portion 51 is formed at a position where the distance between the straight side 41 and the rotational locus becomes maximum. In mounting the speaker unit 1, when the housing 12 is rotated after the claw portions 13 are inserted into the inserting portions 51, the claw portions 13 are allowed to approach the edge portion or the flange 44 of the opening 4.

Then, the mounting rigidity of the speaker unit 1 can be enhanced by bringing the claw portions 13 into engagement with the door inner panel 3 in the vicinity of the flange 44.

As has been described heretofore, according to the in-vehicle speaker rotational mounting structure, by forming the opening 4 not circular but substantially triangular, not only can the speaker mounting rigidity be enhanced sufficiently but also the loss of the acoustic properties of the speaker can be prevented by securing the required opening area.

In addition, in the event that an insertion guide 29 as is shown in FIG. 3 is provided on a rear side 12a of the housing 12, there is provided a further advantage that mounting work of the speaker unit 1 on the door panel 3 can easily be implemented. The mounting work with the insertion guide 29 will be described below.

The respective claw portions 13 on the housing 12 which are to be inserted into the respective slits 5 are formed inwardly of the outer circumference of the speaker housing 12. Namely, when the speaker unit 1 is mounted on the door inner panel 3, the slits 5 are situated inwardly of the outer circumference of the speaker housing 12.

Thus, when mounting the housing 12 on the door inner panel 3, since the worker has to perform the mounting work while he or she cannot see the positions of the claw portions 13 provided on the rear side 12b of the housing 12, it is difficult for him or her to accurately insert the claw portions 13 into the slits 5 in the door inner panel 3.

To cope with this, as shown in FIG. 3, the cylindrical insertion guide 29 is provided closer to the center of the housing 12 than the three claw portions 13. The height of the insertion guide 29 is made to become higher than those of the respective claw portions 13, and the yoke 1-8, the magnet 1-7 and the plate 1-6, which constitute the speaker 11, are mounted in the interior of the insertion guide 29 (refer to FIGS. 1 and 2).

Figure 9:
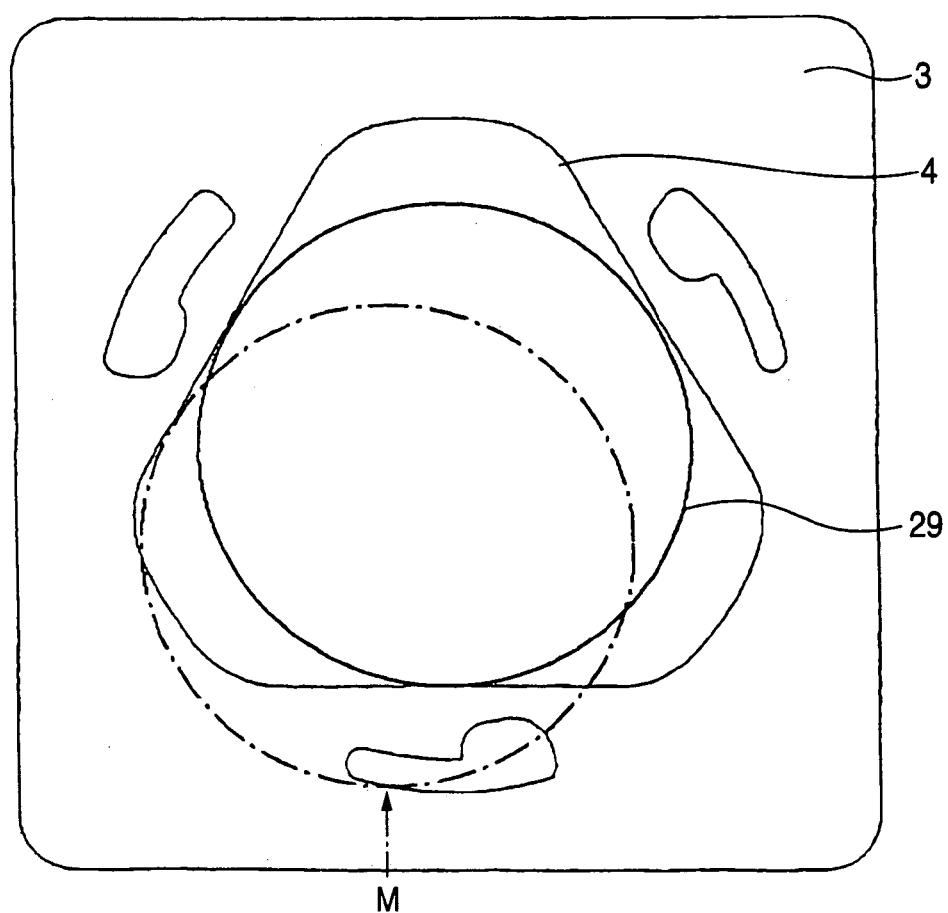
FIG. 9 is a schematic elevational view of the panel member of the in-vehicle speaker rotational mounting structure showing a state in which an insertion guide of the speaker housing is inserted into an opening in the panel member.

FIG. 9 is a schematic front view of the door inner panel 3 and describing aligning work which is to be carried out when mounting the speaker housing 12 on the door inner panel 3. As shown in the figure, when mounting the speaker unit 1 on the door inner panel 3, part of the insertion guide 29 is caused to slide along the side of the triangular opening 4, whereby the entirety of the insertion guide 29 is inserted into the opening 4 in an ensured manner. In other words, as shown by dashed line in FIG. 9, only one part of the insertion guide 29 is inserted into the opening 4, and the other part of a circumferential surface of the insertion guide 29 is in contact with the left side of the substantially triangular opening 4. Then, when a force is applied to the insertion guide 29 upwardly (refer to an arrow M in a dashed line), the insertion guide 20 naturally moves upwardly along the left side of the triangular opening 4 to finally be inserted in to the opening 4 in its entirety.

When the housing 12 is rotated in this state, the plurality of claw portions 13 are inserted into the inserting portions 51 of their corresponding nearest slits 5, respectively, and as shown in FIG. 5, the housing 12 of the speaker unit 1 comes to be mounted on the door inner panel 3.

In addition, since the insertion guide 29 is made higher than the claw portions 13 along the full circumference thereof, even if the insertion guide 29 is inserted into the opening 4 from any direction, the insertion guide 29 naturally comes into contact with any of the sides of the substantially triangular opening 4, and therefore, the worker does not have to pay attention to the direction in which the insertion guide 29 is inserted into the opening 4 in performing mounting work of the speaker unit 1, thereby making it possible to enhance the working efficiency.

The insertion guide 29 also functions as a waterproofing cover, and therefore, there is no need to provide an additional waterproofing cover to thereby suppress the number of components. This contributes to the increase in productivity.

Incidentally, as shown in FIGS. 1 to 3 and FIGS. 10 to 16, working recesses 20 are formed in the housing 12, and when mounting the speaker unit 1 on the door inner panel 3, the worker is expected to rotate the housing while utilizing these working recesses 20 to hold the housing 12. The plurality of working recesses 20 for use in such an event are shown in FIGS. 1 to 3 and FIGS. 10 to 16, and mounting work of the speaker unit 1 on the door inner panel 3 using the work recesses 20 will be described below with reference to those drawings.

Figure 10:
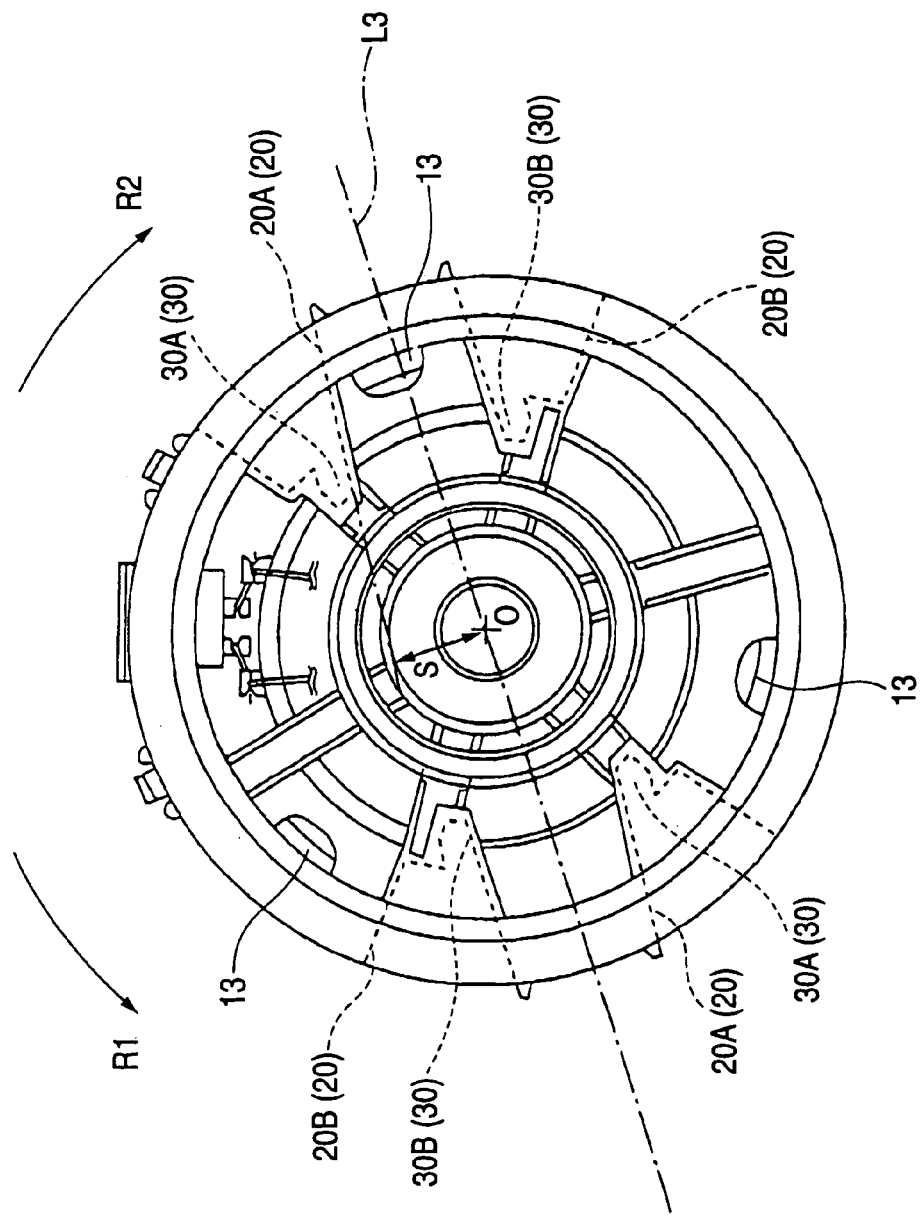
FIG. 10 is a schematic elevational view showing a front side of the speaker housing of the in-vehicle speaker rotational mounting structure.
Figure 11:
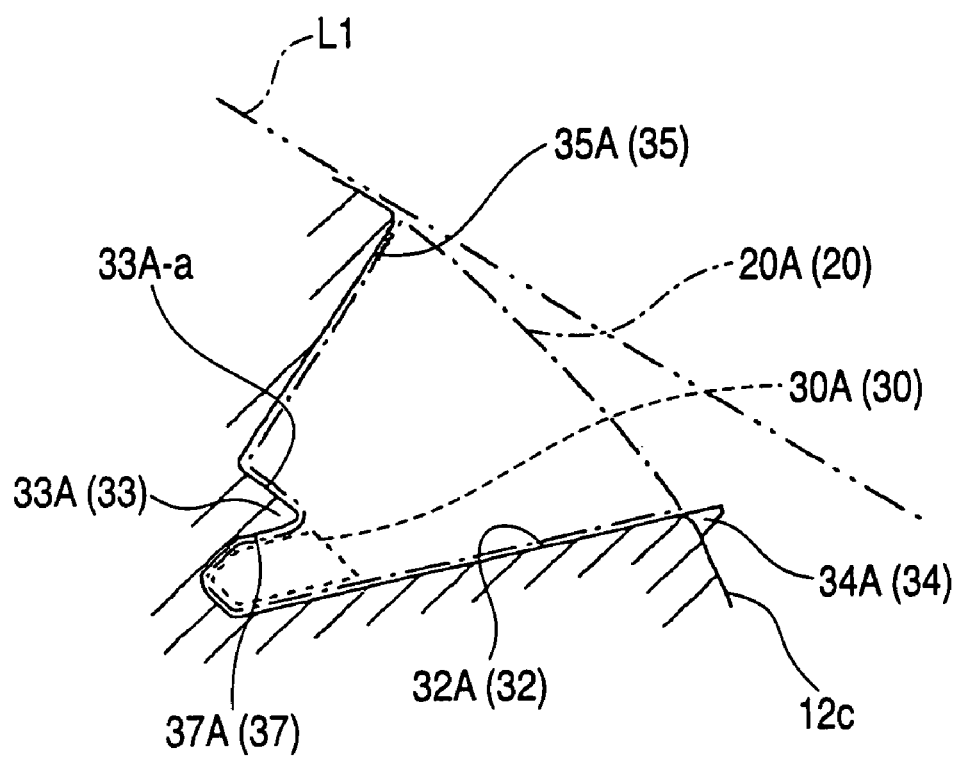
FIG. 11 is a schematic horizontal cross-sectional view of the speaker housing of the in-vehicle speaker rotational mounting structure showing a mount working recess.
Figure 12:
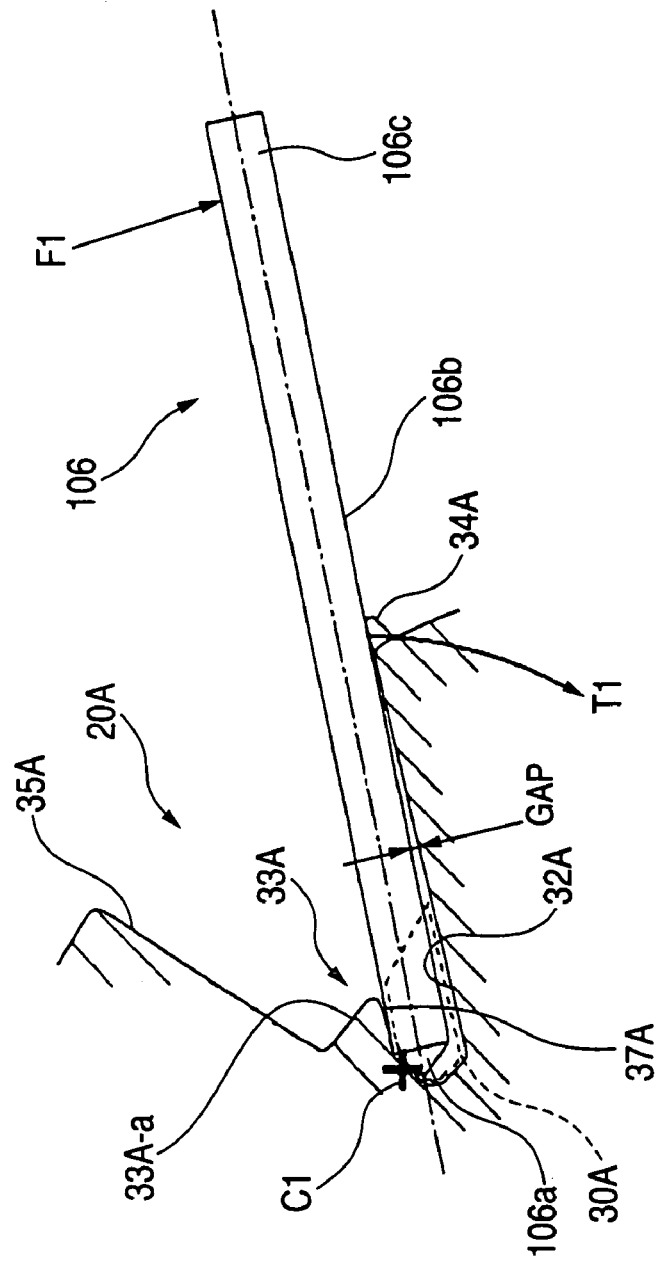
FIG. 12 is a schematic horizontal cross-sectional view of the speaker housing of the in-vehicle speaker rotational mounting structure showing a state in which a general tool is inserted into the mount working recess shown in FIG. 11.
Figure 13:
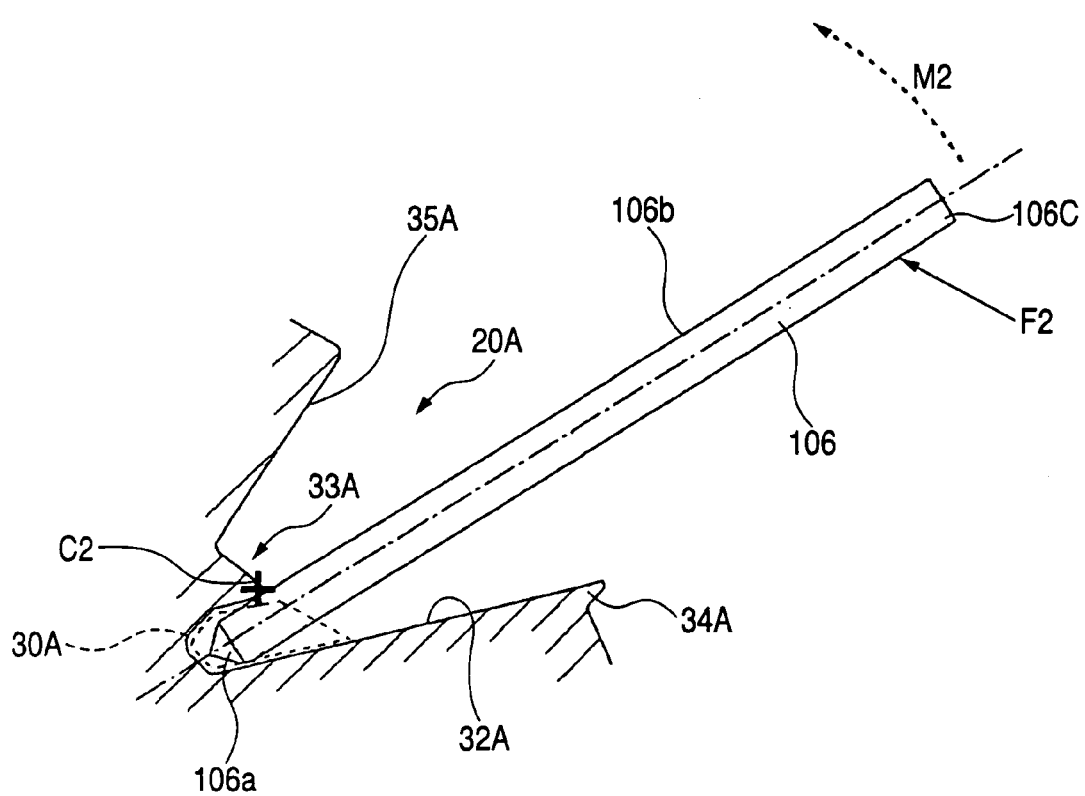
FIG. 13 is another schematic horizontal cross-sectional view of the speaker housing of the in-vehicle speaker rotational mounting structure showing a state in which the general tool is inserted into the mount working recess shown in FIG. 11.
Figure 14:
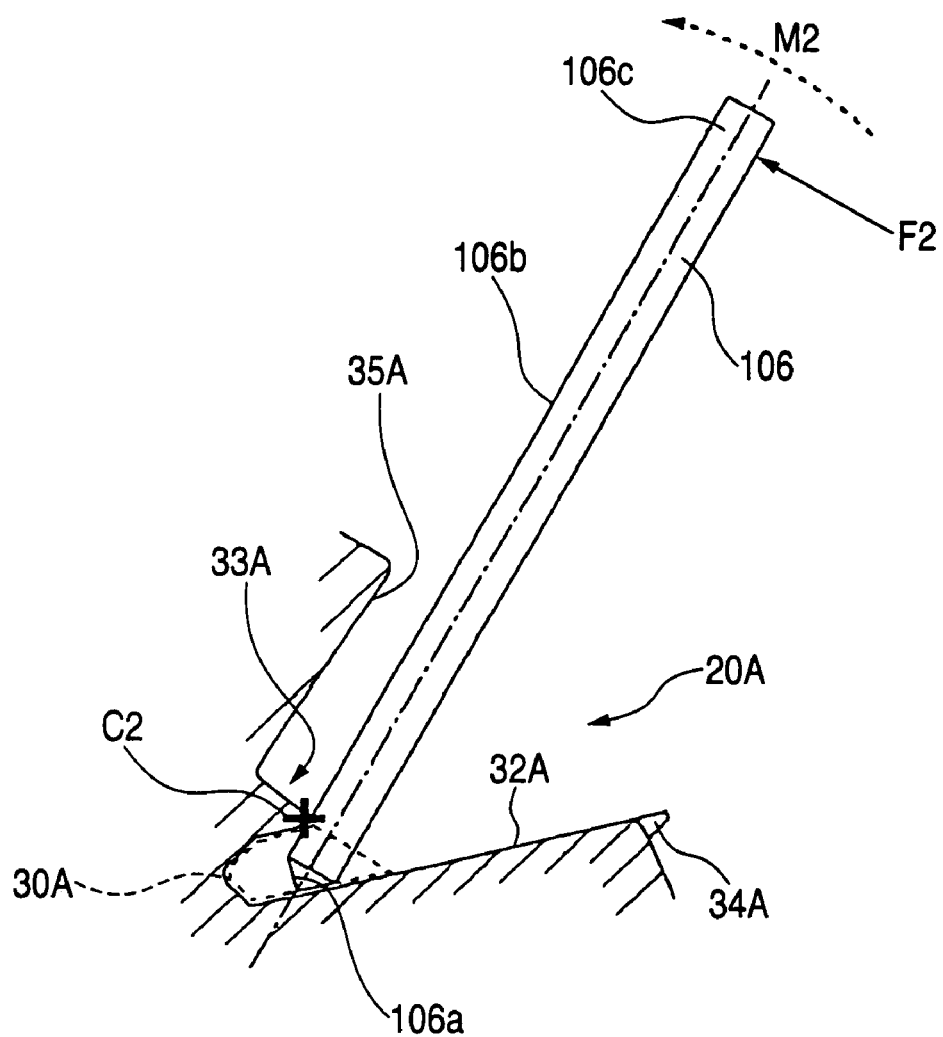
FIG. 14 is a further schematic horizontal cross-sectional view of the speaker housing of the in-vehicle speaker rotational mounting structure showing a state in which the general tool is inserted into the mount working recess shown in FIG. 11.
Figure 15:
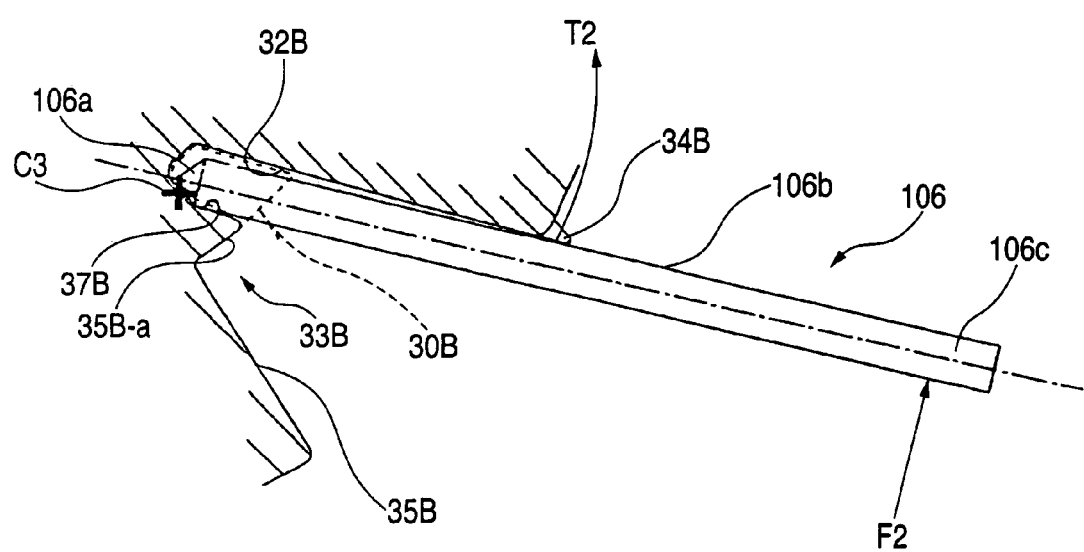
FIG. 15 is a schematic horizontal cross-sectional view of the speaker housing of the in-vehicle speaker rotational mounting structure showing a state in which the general tool is inserted into a removal working recess.

FIG. 10 is a front view showing a front side of the housing 12, FIG. 11 is a schematic horizontal cross section of the speaker housing 12 and shows a working recess for mounting or a mount working recess, FIGS. 12 to 14 are drawings each showing a case where a general tool is inserted into the mounting work recess, and FIG. 15 is a drawing showing a case where the general tool is inserted into a working recess for removing or a removal working recess.

As shown in FIG. 10, each working recess 20 is formed by depressing the outer circumferential surface of the housing 12 in a direction toward the center of the housing 12. The plurality of working recesses 20 are provided at four positions which are symmetrical relative to the center of the speaker unit 1. Additionally, a jig inserting hole 30 is provided at an inner part of each working recess 20.

The working recesses 20 include mount working recesses 20A having a mounting jig inserting hole 30A at inner parts thereof and removal working recesses 20B having a removing jig inserting hole 30B at inner parts thereof. The mount working recess 20A and the removal working recess 20B are disposed adjacent to each other. Hereinafter, the mount working recesses 20A and the removal working recesses 20B may also be described as the working recesses 20 when they are designated collectively. Similarly, the mounting jig inserting holes 30A and the removing jig inserting holes 30B may also be described as the removing jig inserting holes 30 when they are designated collectively.

In addition, although they will be described in detail later, a protruding member 34A provided on an edge portion of the mount working recess 20A and a protruding member 34B provided on an edge portion of the removal working recess 20B may also be described as protruding members 34 when they are designated collectively.

The constructions of the working recesses 20 and the jig inserting holes 30 will be described.

Since the working recesses 20 are holes that are used mainly for the worker to hold the housing 12 securely, recesses need to be formed which are suitable for the worker to grip the housing. This is because the worker needs to hold the housing 12 securely with his or her hand when aligning the housing 12 with the door inner panel 3 accurately in order to insert the plurality of claw portions 13 provided on the rear side of the housing 12 into the slits 5 formed in the door inner panel 3.

With these working recesses 20 provided as has been described above, the worker can rotate the housing 12 basically without using a tool. However, the worker needs to mount several speaker units 1 continuously on a production line, and in the event that the worker is required to rotate housings 12 manually, the worker will have to bear tremendously excessive work load, and hence the working efficiency will be deteriorated.

To cope with this, on the production line, it has been desired to reduce the work load of the worker by using any type of tool to rotate the housings 12. In particular, in the in-vehicle speaker rotational mounting structure according to the invention, a large magnitude of torque is required to rotate the housing 12 (the reason for this will be described later). Thus, it has been an important issue to find a means for using a tool to apply a large magnitude of torque to the housing. In addition, in the event that the tool so used is a general tool such as a screwdriver 10 or the like, no special tool is needed, and the availability of tools can desirably enhanced at low costs.

Consequently, the housing 12 needed to be constructed so as to allow the insertion of such a tool.

From the aforesaid background, not only a "shape that is easy to be gripped by the worker" but also a "shape that allows a tool and a jig to be fitted therein" have been required for the housing 12. In order to fulfill these two requirements, it was conceived to provide separately holes into which the finger of the worker can be inserted and holes in which the tool can be fitted, but with this construction, the number of working processes in the production of housings 12 is increased, and costs required for working as well as working time are in turn increased undesirably.

Then, the invention is constructed such that the working recesses 20 into which the finger of the worker can be inserted are provided in the housing 12, and furthermore, such that the working recesses 20 each have the jig inserting hole 30 at the inner part thereof.

The working recess 20 and the jig inserting hole 30 will be described in detail below by taking the mount working recess 20A and the mounting jig inserting hole 30A for example.

The mounting jig inserting hole 30A is provided at the inner part of the mount working recess 20A, and a general tool such as a screwdriver 106 is fitted in this mounting jig inserting hole 30A, as shown in FIG. 12, so that, when mounting the speaker unit 1 on the door inner panel 3, a large torque is easily applied to the housing 12 to thereby rotate the housing 12.

In addition, this mounting jig inserting hole 30A is used when rotating the housing 12 in a forward direction (in a clockwise direction) relative to the door inner panel 3.

As shown in FIG. 11, a second side wall 32A, a protruding portion 33A and a first side wall 35A are provided inside the mount working recess 20A, and the protruding member 34A which protrudes radially outwardly is provided on the edge of the opening of the mount working recess 20A which is situated on a second wall 32A side thereof.

A tangent line L1 to the outer circumference of the housing 12 is illustrated by a double-dashed line in FIG. 11. The first side wall 35A is provided in such a manner as to intersect with the outer circumferential tangent line L1 substantially at right angles and to extend from the outer circumferential surface 12c of the housing 12 toward the center thereof. In addition, while the second side wall 34A is also provided in such a manner as to extend from the outer circumferential surface 12c to the center of the housing 12, the second side wall 32A inclines slightly toward the first side wall 35A on a center side thereof.

As shown in FIG. 10, an imaginary extension L2 of the second side wall 32A has a distance S from the center O at a point where it approaches the center O as close as possible. Namely, the second side wall 32A is formed in such a manner as to be offset relative to the radial direction toward the center of the speaker unit 1.

The jig inserting hole 30 is also provided within the working recess 20 at the same angle as that of the imaginary extension L2, and is formed, as with the second side wall 32A, in such a manner as to be offset relative to the radial direction toward the center of the speaker unit 1. This construction is adopted in order to avoid the interference with the magnet 1-7 which exists in the vicinity of the center of the speaker unit 1.

In addition, as shown in FIG. 11, the protruding portion 33A is formed by a vertical side 33A-a protruding substantially perpendicularly from the first side wall 35A into the mount working recess 20, and a tool inserting hole side wall 37a is provided in such a manner as to extend in parallel with the second side wall 32A from a vertex of the protruding portion 33A toward a deepest part of the mounting jig inserting hole 30A (which is also a deepest part of the mount working recess 20).

When mounting the speaker unit 1 on the door inner panel 3, the three claw portions 13 on the rear side of the housing 12 are inserted into the first slit portions of the corresponding slits 5 in the door inner panel 3, respectively, and as shown in FIG. 12, a tool such as the screwdriver 106 is inserted into the mounting jig inserting hole 30A. Thereafter, when a force F1 is applied downwardly to a rear end portion 106c of the screwdriver 106, a portion of the screwdriver 106 in the vicinity of a distal end 106a thereof is brought into contact with the tool inserting hole side wall 37A (refer to a point C1 indicated by a cross), and the housing 12 is rotated, as shown in FIG. 10, in the clockwise direction about the center O of the housing 12 by a torque T1 applied using the point C1 as a fulcrum, whereby the claw portions 13 on the rear side of the housing 12 slide from the inserting portions 51 to the fixing portions in the slits 5, respectively, the speaker unit 1 being thereby fixed to the door inner panel 3.

FIG. 15 is a schematic view showing a case where the screwdriver 106, which is a general tool (a jig), is fitted in the removal working recess 20B shown in FIG. 10. The removal working recess 20B is formed into an axially symmetrical shape with the aforesaid mount working recess 20A with respect to a line indicated by a dashed line L3 in FIG. 10, and the detailed description of the construction thereof will be omitted here. In the removal working recess 20B, reference character B, instead of A, will be imparted to constituent elements corresponding to those of the mount working recess 20A.

When removing the speaker unit 1 from the door inner panel 3, as shown in FIG. 15, the screwdriver 106 is inserted into the removal working recess 20B and a force F2 is applied thereto upwardly. Then, a portion of the screwdriver 106 in the vicinity of the distal end 106a thereof is brought into contact with a protruding portion 33B by a side 106b of the screwdriver 106 (refer to a point C3 indicated by a cross), and a portion of a second side wall 32B in the vicinity of the edge of the opening and a protruding member 34B are brought into press contact with the screwdriver 106 by a torque T2 applied using the point C3 as a fulcrum. Then, the housing 12 to which the torque T2 is applied rotates about the center O of the housing 12 in a counterclockwise direction, and the three claw portions 13 situated on the rear side of the housing 12 then slide from the fixing portions 52 to the inserting portions 51 of the corresponding slits 5 in the door inner panel 3, respectively, the speaker unit 1 being thereby put in a state in which the speaker unit 1 is allowed to be pulled to be removed from the door inner panel 3.

Namely, when the speaker unit 1 is mounted on the door 3 as has been described above, the screwdriver 106 is inserted into the mounting jig inserting hole 30A, and in contrast, when the speaker unit 1 has already been mounted on the door panel 3, the screwdriver 106 is inserted into the removing jig inserting hole 30B. However, despite the intention of the worker to mount the speaker unit 1 on the door inner panel 3, there may be anticipated a risk that the screwdriver 106 is inserted into the removing jig inserting hole 30B, or, in contrast to this, despite the intention of the worker to remove the speaker unit 1 from the door inner panel 3, there may be anticipated a risk that the screwdriver 106 is inserted into the mounting jig inserting hole 30A. Even in such the case, the in-vehicle speaker rotational mounting structure according to the invention is constructed so as to deal with those anticipated risks properly. How the anticipated risks are properly dealt with will be described below with reference to FIGS. 13 and 14.

As shown in FIG. 13, when the screwdriver 106 is inserted into the mount working recess 20A in which the mounting jig inserting hole 30A is formed and the force F2 is applied thereto in an upper leftward direction, the portion of the screwdriver 106 in the vicinity of the distal end portion 106a thereof is brought into contact with the protruding portion 33A (refer to the point C2 indicated by the cross), and then, the rear end portion 106c of the screwdriver 106 rotates about this contact point in the counterclockwise direction as indicated by an arrow M2 indicated by a dashed line, while the distal end portion 106a of the screwdriver 106 rotates about the point C2 which functions as a rotational axis in an opposite direction to the direction indicated by the arrow M2, whereby the screwdriver 106 goes out of the mounting jig inserting hole 30A. When the force F2 continues to be applied to the rear end portion 106c of the screwdriver 106, the distal end portion 106a of the screwdriver 106 goes out of the mounting jig inserting hole 30A further, as shown in FIG. 14, and finally, the screwdriver 106 automatically goes out of the mounting jig inserting hole 30A completely.

Namely, since the force F2 so applied does not act on the housing 12, the housing 12 cannot be removed from the door panel 3. When mounting or removing the speaker unit 1 on or from the door inner panel 3 using a general tool such as the screwdriver 106, the housing 12 is constructed not to be rotated without using the jig inserting hole 30 suited to the purpose of the work to be done.

In addition, since the screwdriver 106 automatically comes out of the jig inserting hole 30, the worker can be informed that he or she has inserted the screwdriver 106 into the wrong jig inserting hole 30.

In the event that the screwdriver 106 is erroneously inserted into the working recess 20B having the removing jig inserting hole 30B despite the worker's intention to mount the speaker unit 1 on the door inner panel 3, a similar action in principle to that of the example described with reference to FIGS. 13 and 14 will be performed, and therefore, the description thereof will be omitted here.

Since the worker can securely hold the speaker unit 1 with the fingers inserted into the working recesses 20 as described above by providing the same working recesses 20 when mounting or removing the speaker unit 1 on or from the door inner panel 3, the provision of the working recesses 20 contributes to the enhancement of the workability. In addition, the worker can easily hold the housing 12 with both the hands by providing the respective working recesses 20 at the symmetrical positions relative to the center of the speaker unit 1, whereby the workability can be enhanced further. Also, since the mount working recess 20A and the removal working recess 20B are disposed adjacent to each other, the worker can easily insert his or her fingers into the mount working recesses 20A (the working recesses 20) and the removal working recesses 20B (the working recesses 20), the workability being thereby enhanced further.

In addition, the speaker unit can easily be rotated using a general tool such as the screwdriver by providing the jig inserting holes 30. In particular, even in a case where a large torque is required to rotate the speaker unit 1, the worker can produce a large torque with a small force, whereby the workability can be enhanced.

In particular, since the jig inserting holes 30 are provided at the deeper parts of the working recesses 20, most of the openings and the inner sides of the working recesses 20 can be commonly used, and the number of holes which are formed in the housing 12 can be reduced. In addition, this can prevent the reduction in strength of the housing 12, and reduce the number of working processes in the production of housings 12, whereby the working costs and time can also be reduced.

Furthermore, by providing the protruding member 34 on the edge portion of the opening of the working recess 20, even in the event that the speaker unit 1 is rotated using a general tool such as the screwdriver 106, a case can be avoided where the screwdriver 106 presses against the edge portion of the opening to damage the same.

In addition, the worker can hook his or her finger on this protruding member 34 when holding the housing 12 with his or her hands, whereby the workability can be enhanced.

Figure 16:
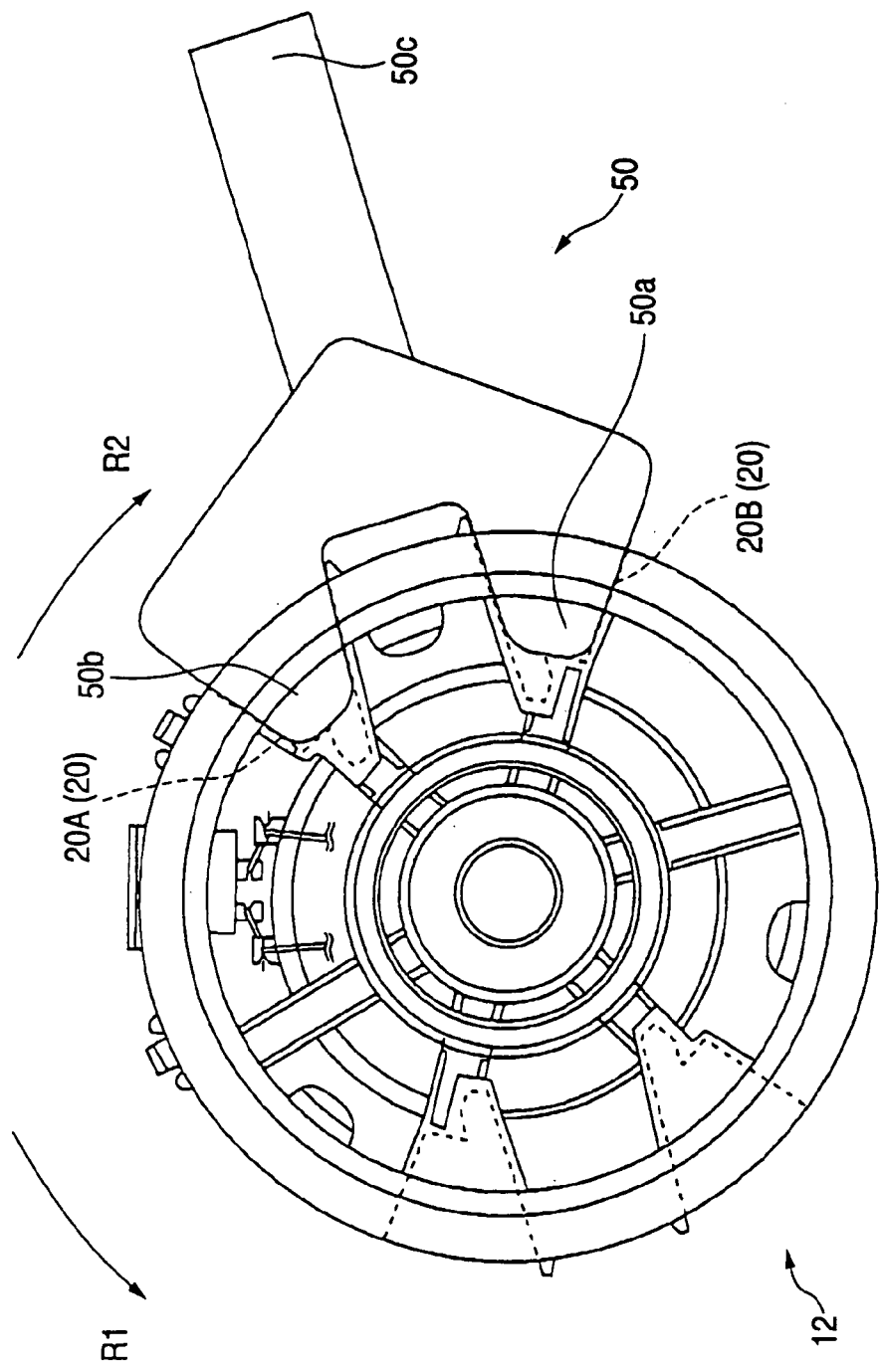
FIG. 16 is a schematic horizontal cross-sectional view of the speaker housing of the in-vehicle speaker rotational mounting structure showing a state in which the special tool is inserted into the working recess shown in FIG. 13.

Furthermore, as shown in FIG. 16, a special tool 50 for rotating the housing 12 may be used. In this case, when distal end portions 50a, 50b of the special tool 50 are both inserted into the working recess 20 with a rear end portion 50c of the special tool 50 being rotated in the clockwise direction, the housing 12 can easily be rotated, whereby the speaker unit 1 is mounted on the door inner panel 3. When the rear end portion 50c of the special tool 50 is rotated in the counterclockwise direction, the housing 12 can easily be rotated in the counterclockwise direction, whereby the speaker unit 1 can easily be removed from the door inner panel 3.

Thus, the worker can produce a large torque with a small force, and the workability in mounting and removing the speaker unit 1 is enhanced.

In addition, such a special tool 50 can be mounted on a distal end of the arm of a robot placed along the production line, whereby automatic rigging can also be dealt with.

Incidentally, as shown in FIGS. 1 and 2, a lower cushion 2 (a seal member) is interposed between the door inner panel 3 and the housing 12. This lower cushion 2 is formed of a compressive resilient body such as sponge and rubber and ensures the closure of a gap between the housing 12 and the surface of the door inner panel 3 despite the provision of the minute irregularities on the surface of the door inner panel 3. Thus, the lower cushion 2 is provided to prevent the ingress of dust and water from the gap. In addition, the lower cushion 2 also functions to absorb shocks and vibrations produced and transmitted to the door inner panel 3 while the vehicle is running so that the shocks and vibrations so produced are not transmitted to the speaker unit 1 as they are.

In order to enhance the dustproofness and waterproofness by the lower cushion 2, a rate at which the lower cushion 2 is compressed between the door inner panel 3 and the housing 12 (a rate of compression) needs to be increased. However, in the event that the rate of compression is increased, a frictional force generated between the door inner panel 3 and the lower cushion 2 and a frictional force generated between the lower cushion 2 and the housing 12 are both increased.

Figure 22:
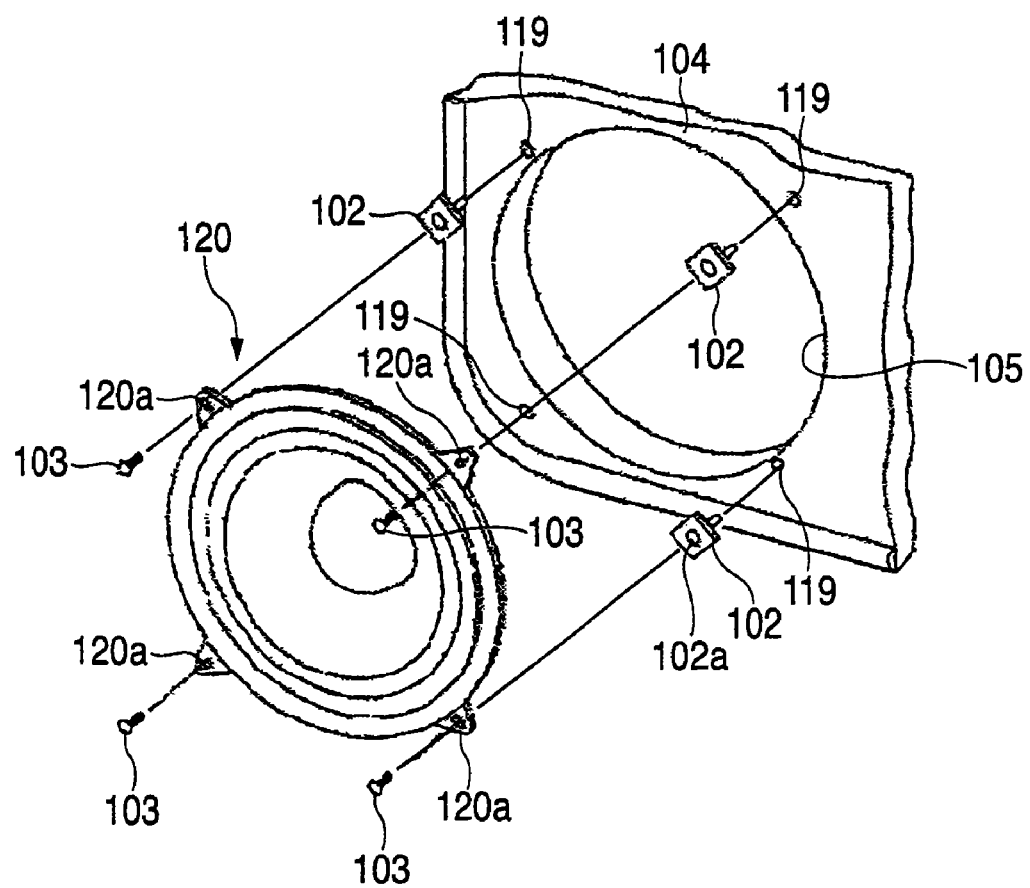
FIG. 22 is a schematic perspective view showing a first example of a conventional in-vehicle speaker mounting structure.
Figure 23:
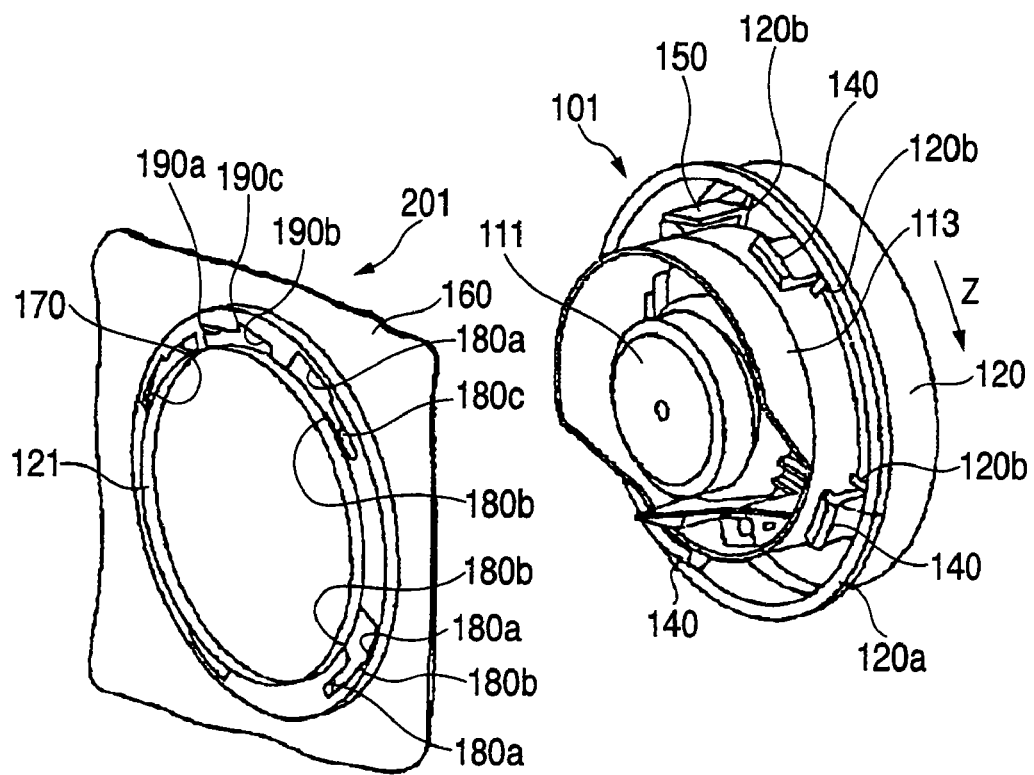
FIG. 23 is a schematic perspective view showing second example of the conventional in-vehicle speaker mounting structure.

In the conventional speaker unit 106 adopting the screw mounting method as shown in FIG. 22, since the conventional speaker unit 106 is not rotated relative to the door panel, when the seal member is interposed between the conventional speaker unit 106 and the door inner panel 3, the rate of compression of the seal member only has to be increased simply. However, in the present embodiment, since the speaker unit 1 is rotated relative to the door inner panel 3 so as to be mounted thereon, in the event that the rate of compression of the lower cushion 2 (the seal member) is increased too high, the workability in mounting is deteriorated.

Namely, in the embodiment, while the lower cushion 2 is securely compressed between the door inner panel 3 and the housing 12, the frictional force produced between the lower cushion 2 and the housing 12 needs to be suppressed. Then, as shown in FIG. 3, a rib (a projection) 45 is provided along the full circumference of a portion in the vicinity of the edge portion on the rear side 12b of the housing 12. A cross-sectional shape of this rib 45 is shown in FIG. 7.

FIG. 7 is a drawing showing a cross section taken along the line Q-Q in FIG. 4 which is an elevation of the rear side of the housing 12. The cross section of the rib 45 is formed into a substantially triangular shape. The rib 45 raises from the rear side of the housing 12 with a distal end 45a thereof being a vertex. This rib 45 constitutes a member which ensures the rotational properties of the housing 12 relative to the door inner panel 13 even while enhancing the rate of compression of the lower cushion 2 when holding to compress the lower cushion 2 between the housing 12 and the door inner panel 3.

The compressed lower cushion 2 expands the rear side 3b of the door inner panel 3 and the rear side 12b of the housing 12 by its restoring force which is a force expanding outwardly. Due to this, as shown in FIG. 7, the housing 12 is firmly fixed in the circumferential direction, as well as in the vertical direction relative to the door inner panel 3, with the surfaces 13c of the claw portions 13 being brought into press contact with the rear side 3b of the door inner panel 3.

In FIG. 7, a double-ended arrow g1 and a double-ended arrow g2 denote distances of gaps between the door inner panel 3 and the housing 12, respectively. The gap g2 is set to be wider than the gap g1, and the lower cushion 2 is compressed to be held within these gaps g1 and g2, or between the housing 12 and the door inner panel 3.

When mounting the housing 12 on the door inner panel 3, as has been described above, the three claw portions 13 existing on the rear side of the housing 12 are inserted into the first slit portions of the corresponding slits 5 in the door inner panel 3, respectively. As this occurs, the lower cushion 2 provided between the rear side 12b of the housing 12 and the door inner panel 3 is compressed sufficiently by the rib 45.

In the lower cushion 2, only a rate of compression at a portion of the lower cushion 2 which is held between the rib vertex 45a and the door inner panel 3 (hereinafter, also referred to as a "first compression rate P1") is increased locally, and on the other hand, a rate of compression of the remaining portion of the lower cushion 2 which is held between the rear side of the housing 12 except for the rib 45 and the door inner panel 3 (hereinafter, also referred to as a "second compress rate P2") becomes lower than the first compression rate P1. Namely, the expansion of the gap g1 can compress the lower cushion 2 sufficiently by the provision of the rib 45, whereby the waterproofness is enhanced, whereas the frictional force generated between the lower cushion 2 and the door inner panel 3 is suppressed due to the gap g2 between the door inner panel 3 and the surface 12a of the housing being larger than the gap g1.

According to the construction as has been described heretofore, water and dust which attempt to intrude between the housing 12 and the door inner panel 3 from the outer circumference of the housing are firmly captured by the lower cushion 2. At the same time, when the housing 12 of the speaker unit 1 is mounted on the door inner panel 3, since the housing 12 rotates smoothly relative to the door inner panel 3, the deterioration in workability can be suppressed.

In addition, the height of the vertex 45a of the rib 45 may be constructed to vary according to the distance from the claw portions 13.

This is because, when the lower cushion 2 is compressed between the rear side 12b of the housing 12 and the rear side 3b of the door inner panel 3, while the lower cushion 2 attempts to expand by the restoring force thereof, since portions in the vicinity of the claw portions 13 can resist the restoring force, the gap g1 shown in FIG. 7 becomes substantially constant. However, since a portion in the vicinity of a point where a line illustrated by a dashed line L4 in FIG. 4 intersects with the rib 45 situated away from the claw portions 13, a gap wider than the gap g1 may be generated by the restoring force of the lower cushion 2.

Due to this, a construction may be adopted in which the height of the rib vertex 45a is slightly higher at the other locations than the vicinity of the claw portions 13. With this construction, when the restoring force of the lower cushion 2 is caused to act, the gap g1 which is the distance between the rib vertex 45a and the door inner panel 3 can be made substantially constant, and hence the rate of compression P1 of the lower cushion 2 at the gap g1 can be made substantially constant.

By this construction, the waterproofness can be enhanced by the lower cushion 2, whereas the frictional force generated between the lower cushion 2 and the surface 3a of the door inner panel 3 can be suppressed appropriately, whereby not only can the rotational performance of the housing 12 of the speaker unit 1 be ensured but also the workability can be enhanced.

Incidentally, as shown in FIG. 7, a contact surface (hereinafter, also referred to as a "claw portion surface") 13c of the claw portion 13 which comes into contact with the door inner panel 3 is constructed so as to have two contact surfaces having different heights. The door inner panel 3 is formed by bringing two plates having different thicknesses into contact with each other. According to the embodiment, even in the event that the thickness of the panel varies depending on locations thereof, the speaker unit 1 is allowed to be firmly mounted on the door inner panel 3.

One of the two contact surfaces of the claw portion 13 is a thin contact surface 13c-1 which is used when the thickness of the door inner panel 3 is thin, and the other is a thick contact surface 13c-2 which is used when the thickness of the door inner panel 3 is thick. Namely, a difference in level is provided in the contact surface of the claw portion 13 so that the heights of the respective contact surfaces differ from each other, whereby, even in the event that the thickness of the door inner panel 13 varies, the housing 12 is allowed to be firmly mounted on the door inner panel 3. Note that a "claw portion contact surface 13c" may also be used when the two thin contact surface 13c-1 and thick contact surface 13c-2 are designated collectively.

Figure 17:
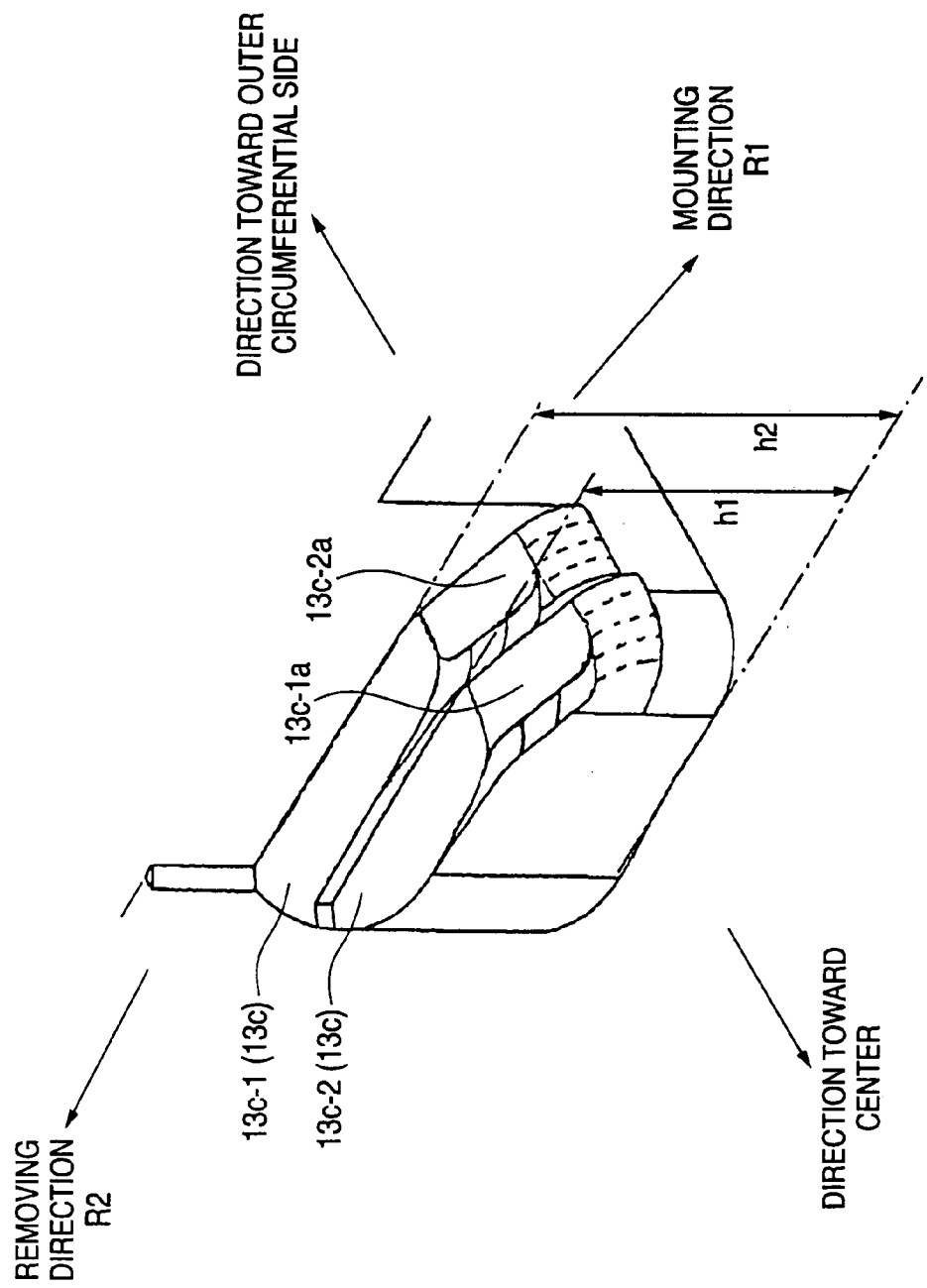
FIG. 17 is a schematic perspective view showing a claw portion of the speaker housing of the in-vehicle speaker rotational mounting structure.

A perspective view of the claw portion 13 is shown in FIG. 17. In the contact portion 13, the thin contact surface 13c-1 has a height h2 and is provided on an outer circumferential side of the housing 12, whereas in the claw portion 13, the thick contact surface 13c-2 has a height h1 and is provided on a center side of the housing 12. In addition, slopes 13c-1a, 13c-2a are formed on front edges in a mounting direction of the thin contact surface 13c-1 and the thick contact surface 13c-2, respectively. These slopes 13c-1a, 13c-2a are provided so as to allow the claw portion contact surface 13 of the claw portion 13 which is inserted into the silt 5 in the door inner panel 3 to slide smoothly from the inserting portion 51 to the fixing portion 52.

As has been described above, in the event that the plurality of heights are provided for the claw portion contact surfaces 13c, the configuration of the slit 5 in the door inner panel 5 needs to be formed in such a manner as to match the thicknesses of the door inner panel 3. This will be described with reference to FIG. 18.

Figure 18:
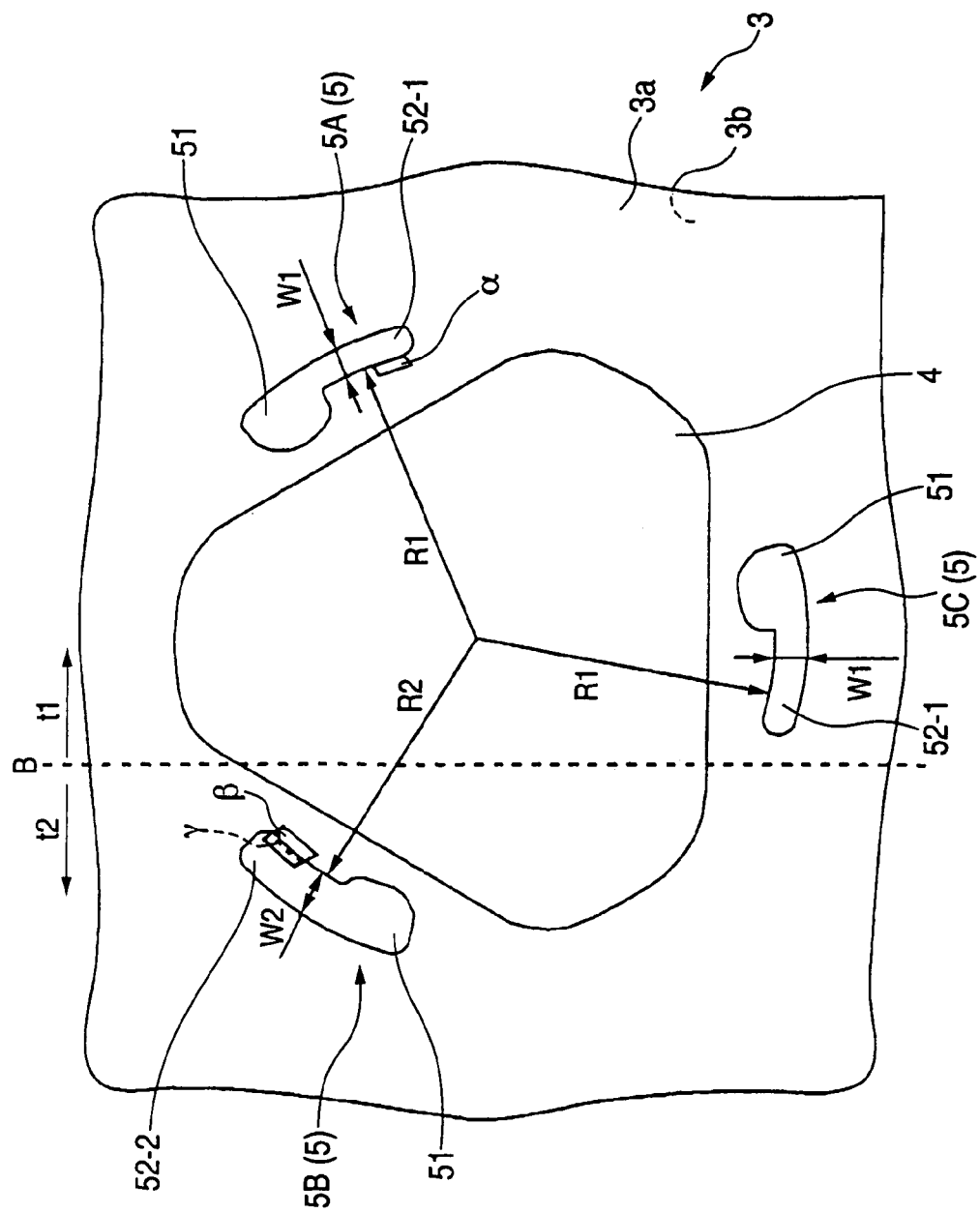
FIG. 18 is a schematic front view showing a front side of the panel member of the in-vehicle speaker rotational mounting structure showing a case where the thickness of the panel member differs.

FIG. 18 is a schematic view of the vicinities of the opening 4 in the door inner panel 3, and shows a state as viewed from the front side 3a of the door inner panel 3, the first slit 5A, the second slit 5B and the third slit 5C being provided on the perimeter of the opening 4.

The first slit 5A and the third slit 5C are made up of the inserting portion 51 and the thin-plate fixing portion 52-1, respectively. The second slit 5B is made up of the inserting portion 51 and the thick-plate fixing portion 52-2. Namely, the configurations of the first slit 5A and the third slit 5C are identical, whereas only the second slit 5B has a configuration which differs from those of the first slit 5A and the third slit 5C.

The difference will be described here by comparing the first slit 5A with the second slit 5B.

A curvature R1 of a center side arc of the thin-plate fixing portion 52-1 formed in the first slit 5A is constructed to become larger than a curvature R2 of a center side arc of the thick-plate fixing portion 52-2 formed in the second slit 5B, and the configurations of the first slit 5A and the second slit 5B are substantially the same except for this difference in curvature. As a result, a gap W1 in the thin-plate fixing portion 52-1 in the first slit 5A becomes narrower than a gap W2 in the thick-plate fixing portion 52-2 in the second slit 5B.

Thus, the gap W1 in the first slit 5A is constructed so as to differ from the gap W2 in the second slid 5B to thereby deal with the construction in which the thickness of the door panel 3 is made to differ at a position where the first slit 5A is situated from a position where the second slit 5B is situated. Namely, the thickness of the door panel 3 shown in FIG. 18 differs across a boundary line B indicated by a chain line, and the thickness of the right door panel is denoted by t1, whereas the thickness of the left door panel by t2, the thickness t1 of the right door panel being formed to be thinner than the thickness t2 of the left door panel.

Incidentally, the door inner panel 3 in this embodiment which is made up of the members having the different thicknesses is produced using a technique referred to as a tailored blank. The tailored blank means a technique for laser welding together plates having different thicknesses or formed of different materials before pressing so as to promote the reduction in vehicle weight or modularization.

The thin-plate contact surface 13c-1 having the height hi is set at a height which is suitable for the panel having thickness t1, and the thick-plate contact surface 13c-2 having the height h2 is set at a height which is suitable for the panel having the thickness t2.

Since the claw portion contact surface 13c and the slit 5A are constructed as has been described heretofore, when mounting the housing 12 on the door inner panel 3, the claw portion 13 provided on the rear side 12b of the housing 12 is inserted into the inserting portion 51 in the first slit 5A, and thereafter, when the claw portion 13 slides into the thin-plate fixing portion 52-1 by the rotation of the housing 12, only the thin-plate contact surface 13c-1 of the claw portion 13 comes into contact with a portion (an area indicated by α on the rear side 3b of the door inner panel 3 which is situated closer to the center than the thin-plate fixing portion 52-1, as shown in FIG. 18).

At the same time, the claw portion 13 is inserted into the inserting portion 51 in the second slit 5B, and when the claw portion 13 slides into the thick-plate fixing portion 52-2 in association with the rotation of the housing 12, only the thick-plate contact surface 13c-2 of the claw portion 13 comes into contact with a portion (an area indicated by β) in the vicinity of the center side of the thick-plate fixing portion 52-2 on the rear side 3b of the door inner panel 3 shown in FIG. 18. This is because since the thin-plate contact surface 13c-1 whose height is higher than that of the thick-plate contact surface 13c-2 of the claw portion 13 falls into an area indicated by γ in the gap W2 in the second slit 5B, as a result, only the thick-plate contact surface 13c-2 is allowed to come into contact with the door panel 3.

By this construction, the claw portion 13 and the second slit 5B are brought into engagement with each other in the state as shown in FIG. 7.

Since the configuration of the third slit 5C is identical to that of the first slit 5A and the inserting and sliding operations of the claw portion 13 are identical to those of the first slit 5A, the description of the third slit 5C will be omitted here.

Since the claw portions 13 and the slits 5 in the door inner panel 3 are constructed as has been described heretofore, even in the event that the thickness of the door inner panel 3 which is the object of the mounting of the speaker unit 1 differs locally, the speaker unit 1 can be mounted on the door inner panel 3 which is the tailored blank by providing the plurality of surfaces having the different heights on the surfaces 13c of the claw portions 13 provided on the rear side 12b of the housing 12 and varying the configurations of the slits 5 formed in the door inner panel 3 for insertion of the claw portions 13 according to the thickness of the door inner panel 3.

Namely, even in the event that the thickness of the door inner panel 3 differs locally, since there is no need to change types of housings 12, the design costs of housing can be reduced, and since there is no need to provide a plurality of production lines of housing 12, a certain advantage can be provided. In the mounting work of the speaker unit 1, since the housing 12 of one type only has to be mounted irrespective of the thickness of the door inner panel 3, the working efficiency can be enhanced.

While the case is described here where the thickness of the door inner panel 3 changes using the tailored blank technique, even in a case where mounting is made relative to door inner panels having different thicknesses due to a difference in model and grade, it is possible to deal with the case similarly, and this equally contributes to the enhancement in working efficiency.

Figure 25:
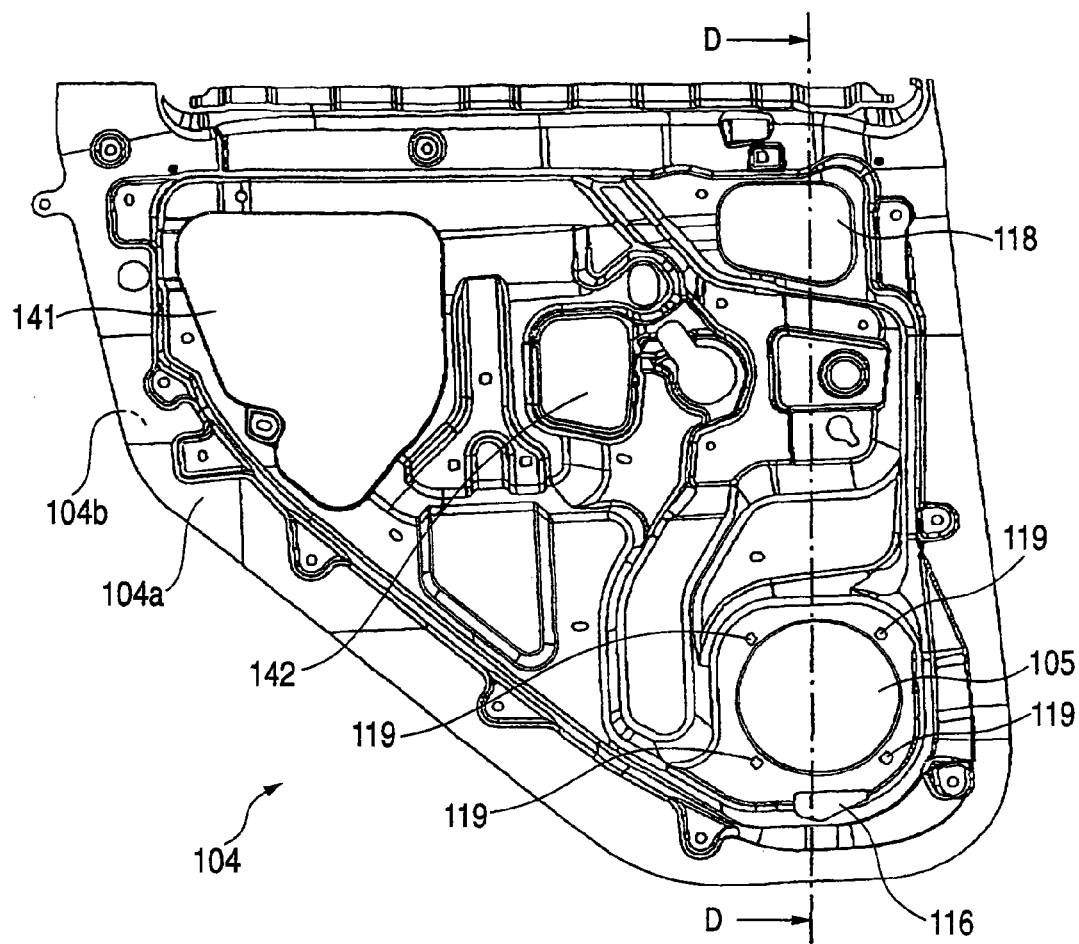
FIG. 25 is a schematic front view showing the entirety of a door inner panel of the first example of the conventional in-vehicle speaker mounting structure.

Incidentally, a schematic front view of a conventional door inner panel 104 as viewed from the inside of the passenger compartment is shown in FIG. 25. The side of the conventional door inner panel 104 shown in FIG. 25 may also be described as a door inner panel front side 104a, whereas a rear side of the door inner panel 104 may also be described as a door inner panel rear side 104b. In addition, since constituent components of the door inner panel 104 shown in FIG. 25 to which no reference numerals are imparted are general, the description thereof will be omitted here.

A conventional speaker 120 as shown in FIG. 22 is mounted on the conventional door panel 104 at a portion in the vicinity of a lower end thereof. In the conventional door panel 104, a water drain hole 116 is provided on a lower side of an opening 105 into which the speaker 120 is inserted. This conventional water drain hole 116 will be described using FIG. 24.

Figure 24:
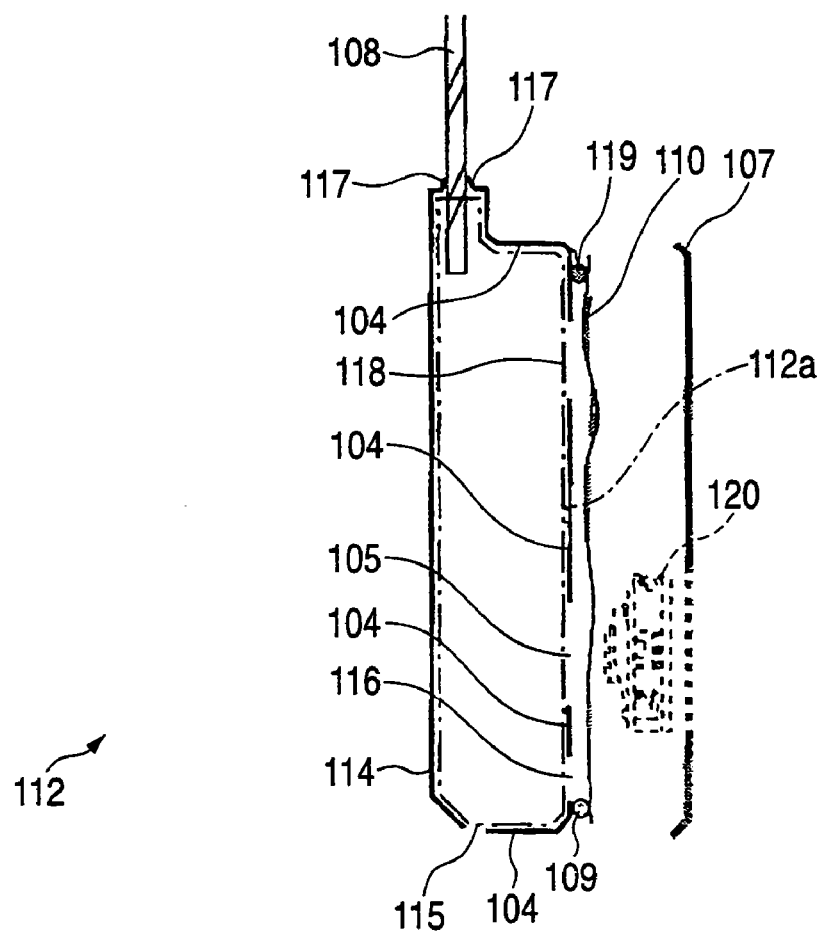
FIG. 24 is a schematic cross-sectional view showing the first example of the conventional in-vehicle speaker mounting structure.

FIG. 24 is a cross-sectional view of a conventional door schematicly showing a cross section taken along the line D-D in FIG. 25. The conventional door 112 is mainly made up of a door outer panel 114 provided on an external side of a vehicle and the aforesaid door inner panel 104, and devices such as a side window glass 108 that can be raised, a window regulator (not shown), a door latch (not shown), a door lock sensor (not shown), a lighting wiring harness (not shown) are installed within a door interior spade 112a which is a space between the door outer panel 114 and the door inner panel 104. Since these devices are general ones, the description thereof will be omitted here.

In addition, a weather strip 117 is provided at an upper end of the door outer panel 114 and at an upper end of the door inner panel 104, respectively, and the weather strips 117 so provided are brought into press contact with sides of the side window glass 108, respectively, to thereby prevent the ingress of water and dust into the door interior space 112a.

However, it is very difficult to prevent the actual ingress of water and dust into the door interior space 112a. For example, in the case of water, there may be a case where water naturally enters the door interior space 112a when the side window glass 108 is raised and/or lowered when it rains.

Water that has entered the door interior space 112a flow downwardly by gravity and is then discharged to the outside of the door 112 through a water discharge hole 115 which is a hole provided at a lowest portion of the door 112.

However, holes (component fitting openings) denoted by reference numerals 118, 141, 142 in FIG. 25 are formed in the door inner panel 104, and there may occur a case where water that has entered the door interior space 112a enters the interior of the vehicle through these holes (component fitting openings) 118, 141, 142. In the case of a vehicle which is specified as having no speaker installed therein, the opening 105 which functions as a speaker fitting opening also becomes a hole through which the water that has entered the door interior space attempts to enter the interior of the vehicle.

A butyl seal 109 and a waterproofing sheet 110 affixed to the surface of the door by the butyl seal 109 prevent the ingress of the water that has entered the door interior space 112a into the interior of the vehicle.

The waterproofing sheet 110 is affixed by the butyl seal 109 (a sealing agent) to the surface of the door inner panel 104 which is situated on a passenger compartment side. In addition, the waterproofing sheet 110 is designed to be interposed between the door inner panel 104 and a door trim 107. In addition, when the speaker 120 is mounted on the door inner panel 104, a cut is given in the waterproofing sheet 110 at a portion corresponding to the opening 105 so that the speaker 120 can be fitted in the opening 105.

Namely, should the water that has entered in the door interior space 112a attempt to enter the interior of the vehicle, the water attempting to do so is dammed up by the waterproofing sheet 110 and the butyl seal 109. Thereafter, the water flows downwardly by gravity between the waterproofing sheet 110 and the front side 104a of the door inner panel 104. Then, the water is returned to the door interior space 112a from the water drain hole 116 which is the hole situated at the lowest position among the holes formed in the door inner panel 104, and is finally discharged to the outside of the door 112 through the water discharge hole 115 in the door 112.

However, there is caused by the formation of the water drain hole 116 a problem that a limitation is imposed on a lowest limit position where the speaker 120 is installed. Namely, the volume of the door interior space 112a shown in FIG. 25 is not so large, and, there is a shortage of a space for installation of devices, in particular, from the vicinity of a central portion to an upper portion of the door interior space 112a in which the window regulator, the door latch, the door lock sensor and the lighting wiring harness, which are all not shown, are provided. Due to this, the speaker 120 is provided on the door 112 at as low a position as possible.

However, since the aforesaid water drain hole 116 needs to be the hole which is formed in the door panel 104 at the lowest position in view of the functional nature thereof, the opening 105 in which the speaker 120 is fitted needs to be provided above the water drain hole 116, and at the same time, the water drain hole 116 needs to be provided a certain distance away from the opening 105 in view of the acoustic properties thereof, as well as a problem associated with the strength. Due to this, there is a limitation on the installation of the speaker 120 on the door inner panel 104 at lower positions thereof.

Furthermore, abnormal noise is generated when the waterproofing sheet 110 vibrates at the portion where the cut is imparted due to sound generated from the speaker 120. This noise is so-called beat noise, and the generation of such noise needs to be prevented.

Figure 19:
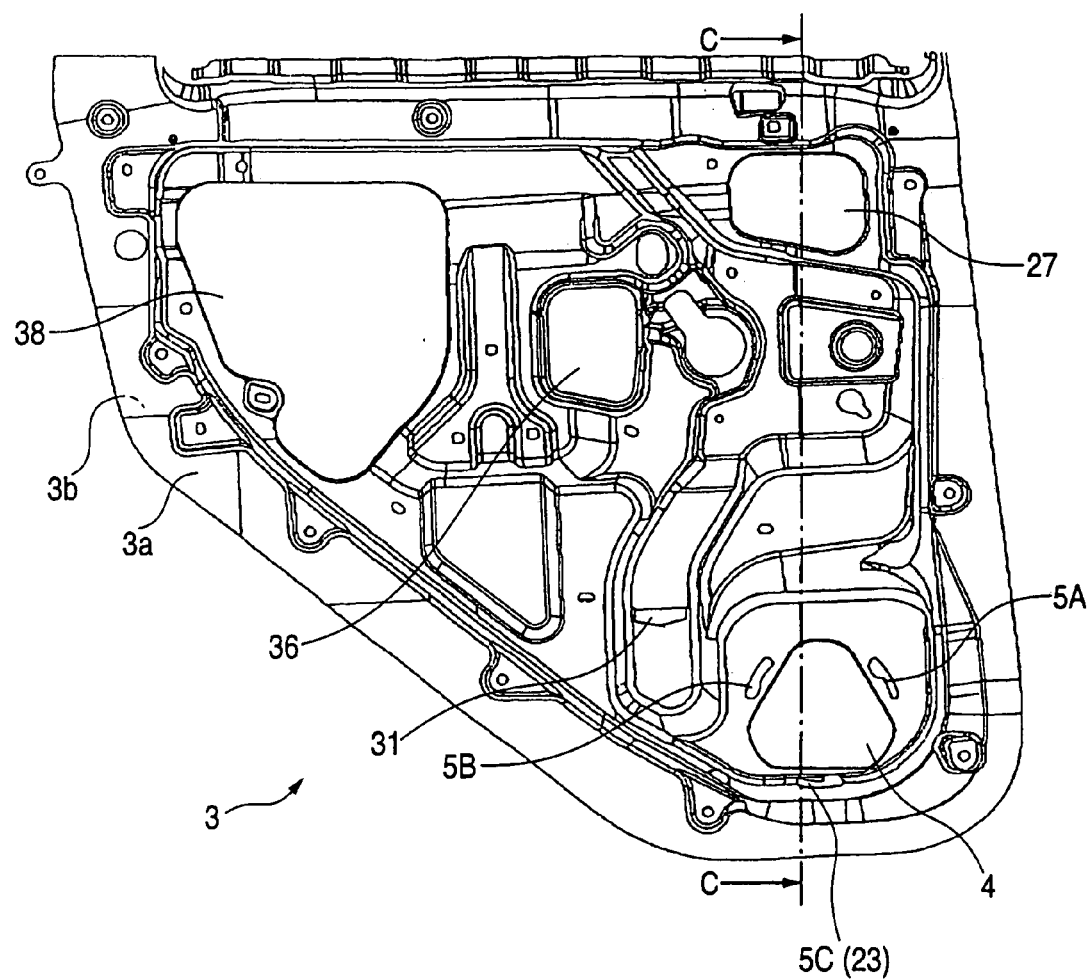
FIG. 19 is a schematic front view showing a front side of the entirety of the panel member of the in-vehicle speaker rotational mounting structure.

To attain this, in the embodiment, as shown in FIG. 19, the third slit 5C which is provided below the opening 4 and is situated at the lowest position among the three slits 5 is constructed so as to also function as the aforesaid water drain hole. This construction will be described below using FIGS. 19, 20 and 21.

Figure 20:
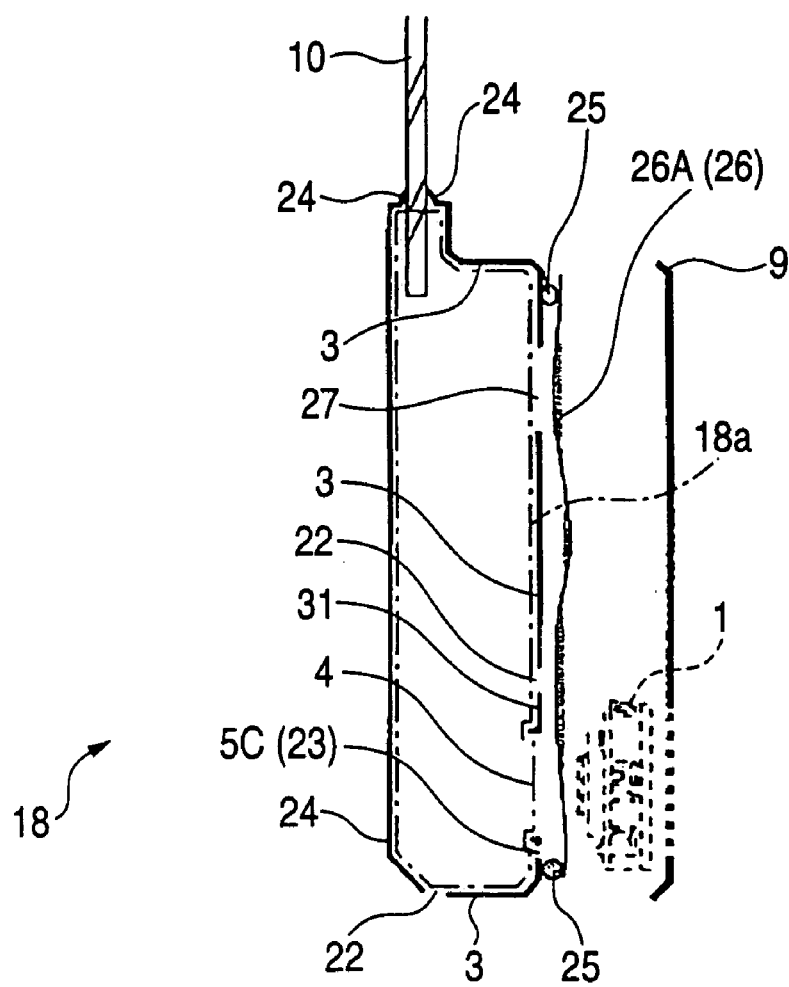
FIG. 20 is a schematic cross-sectional view showing the cross section of a door in the in-vehicle speaker rotational mounting structure, taken along line C-C in FIG. 19.
Figure 21:
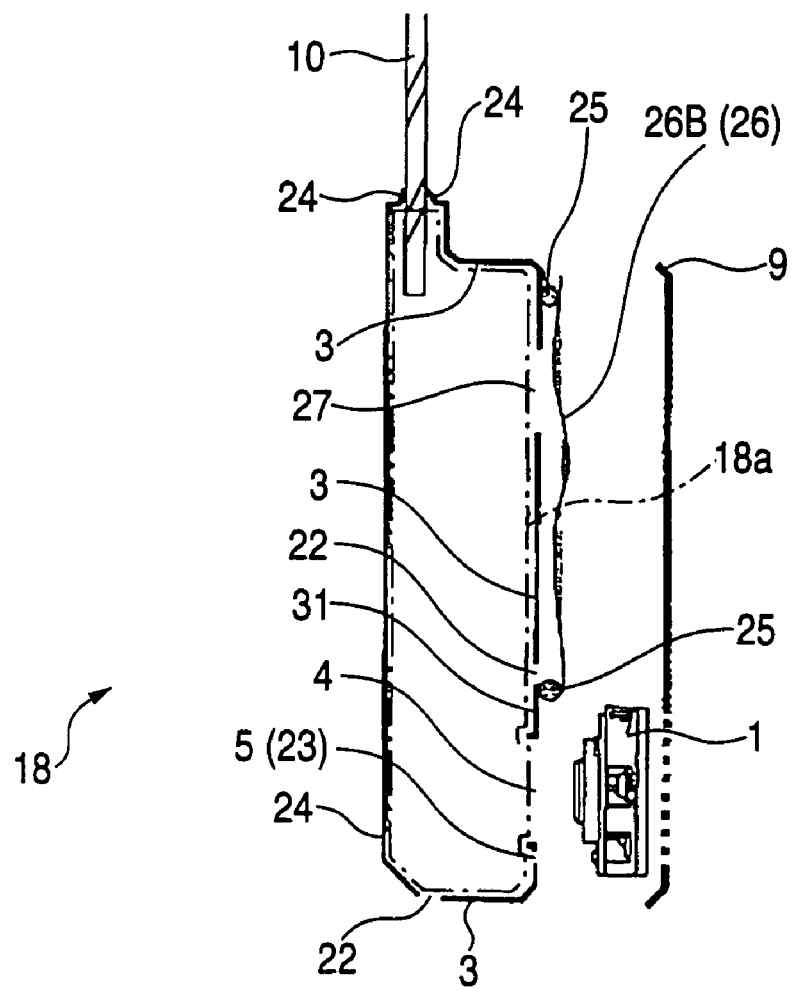
FIG. 21 is a schematic cross-sectional view showing the cross section of the door in the in-vehicle speaker rotational mounting structure, taken along line C-C in FIG. 19.

FIG. 19 is a schematic front view of the door inner panel 3 of the invention as viewed from the passenger compartment side, FIG. 20 is a cross-sectional view of a door which shows schematicly a cross section of the door taken along the line C-C in FIG. 19 with no speaker unit 1 being provided. In addition, FIG. 21 is also a cross-sectional view of the door which schematicly shows the cross section thereof taken along the line C-C in FIG. 19, and in this case, differently from the construction shown in FIG. 20, the speaker unit 1 is provided. In the door inner panel 3 shown in FIG. 19, since constituent components to which no reference numeral is imparted are general, the description thereof will be omitted here.

A rotational-mount type speaker unit 1 as shown in FIGS. 1 and 2 is to be mounted at a position in the vicinity of a lower end of the door inner panel 3 shown in FIG. 19, where substantially triangular opening 4, the first slit 5A, the second slit 5B, and the third slit 5C are formed. Since these constituent components have already been described with reference to FIGS. 6A and 6B, the description thereof will omitted here.

The door 18 shown in FIGS. 20 and 21 is made up mainly of a door outer panel 24 provided on the external side of the vehicle and the door inner panel 3, and a side window glass 10 that can be raised, a window regulator (not shown), a door latch (not shown), a door lock sensor (not shown), and a lighting wiring harness (not shown) are installed within a door interior space 18a which is a space between the door outer panel 24 and the door inner panel 3.

In addition, a waterproofing vinyl (a waterproofing sheet) 26 is affixed by a butyl seal (a sealing agent) 25 to the surface of the door inner panel 3 which is situated on the passenger compartment side, and a door trim 9 is provided inwardly of this waterproofing vinyl 26 in the passenger compartment. In addition, a waterproofing vinyl 26 shown in FIG. 20 is a long waterproofing vinyl 26A whose lower end is situated at a position which is lower than the third slit 5C. On the other hand, a waterproofing vinyl 26 shown in FIG. 21 is a short waterproofing vinyl 26B whose lower end is situated at a position which is higher than the third slit 5C whose lower end is situated above the opening 4.

The door of the vehicle which is specified, as shown in FIG. 20, as having no speaker unit 1 provided on the door inner panel 3 will be described. The opening 4 in which the speaker unit 1 can be fitted is formed at a lower portion on the door inner panel 3 shown in FIG. 20, and the third slit 5C is provided below the opening 4. In addition, a second water drain hole 31 is provided above the opening 4. This second water drain hole 31 is a water drain hole when the speaker 1 unit is mounted on the door panel 3.

According to the construction, water entering from an upper portion of the door 18 through a gap between the side window glass 10 and the weather strips 24 flows downwardly by gravity within the door interior space 18a and is then discharged to the outside of the door 18 from a water discharge hole 22 provided in the door outer panel 24. In addition, water entering inwardly of the vehicle through a component fitting hole 27, the second water drain hole 31 and the opening 4 is dammed up by the waterproofing sheet 26 and the butyl seal 25 and the flows downwardly by gravity between a front side 3a of the door inner panel 3 and the waterproofing vinyl 26. The water enters again the door interior space 18a passing through the third slit 5C which is the hole located at the lowest position among the plurality of holes formed in the door inner panel 3 and which is located lower than the opening 4 and is finally discharged to the outside of the door 18 from the water discharge hole 22.

Namely, the third slit 5C also functions as a water drain hole (hereinafter, also occasionally described as a "first water drain hole") 23 which is a hole for use in returning water existing between the front side 3a of the door inner panel 3 and the waterproofing vinyl 26 to the door interior space 18a.

Due to this, since there is no need to provide a special water drain hole in the vicinity of the lower end of the door 18 as in the case with the conventional water drain hole 116 shown in FIGS. 24 and 25, even in the event that the speaker unit 1 is mounted on the door inner panel 3, as shown in FIG. 21, the installation position of the speaker unit 1 can be set lower than the conventional example.

In addition, in the event that the speaker unit 1 is mounted on the door panel 3 as shown in FIG. 21, the lower butyl seal 25 is provided along a lower edge of the second water drain hole 31, and water which enters inwardly of the vehicle through the component fitting hole 27 or the like is dammed up by the water proofing sheet 26B and the butyl seal 25, then, flows downwardly by gravity between the front side 3a of the door inner panel 3 and the waterproofing vinyl 26B, passes through the second water drain hole 31 to enter again the door interior space 18a and is finally discharged from the water discharge hole 22 to the outside of the door 18.

As shown in FIG. 6A, since the side of the third slit 5C on the outer circumferential side thereof is formed into an arc-like shape which protrudes downwardly, water that has flowed between the front side of the door inner panel 3 and the waterproofing vinyl 26 naturally collects at a lower end of the arc-like shape, whereby the water so collecting is allowed to smoothly flow into the door interior space 18a.

In addition, as shown in FIG. 21, since there is no case where the opening 4 is closed with the waterproofing vinyl 26B, even when the speaker unit 1 is mounted on the door inner panel 3, there is no need to impart a cut in the waterproofing vinyl which is the case with the conventional example. Due to this, the generation of beat noise can be prevented that would otherwise be generated by the waterproofing vinyl in which the cut is so imparted.

Since the in-vehicle speaker rotational mounting structure according to the first embodiment of the invention is constructed as has been described heretofore, the following functions and advantages can be provided.

Firstly, in mounting the speaker unit 1 on the door inner panel 3, the worker aligns the three claw portions 13 provided on the rear side 12b of the housing 12 of the speaker unit 1 with the three slits provided in the door inner panel 3.

As this occurs, the worker cannot see the positions of the claw portions 13 provided on the rear side 12b of the housing 12 due to the outer circumference of the housing 12, and, equally, the worker cannot see the positions of the slits 5 in the door inner panel 3. Due to this, while whether or not the respective claw portions 13 have been inserted in to the corresponding slits 5 is determined through the sensation from the hands, since the insertion guide 29 is provided on the rear side 12b of the housing 12 according to the invention, the worker only has to pay attention to inserting part of the insertion guide 29 into the opening 4 which is formed into the substantially triangular shape in the door inner panel 3 as shown in FIG. 9, the necessity of vertical and horizontal alignments of the speaker unit 1 relative to the door inner panel 3 being thereby obviated.

Then, as shown by the solid line in FIG. 9, with the insertion guide 29 being fitted in the opening 4 in the door inner panel 3 completely, when the housing 12 is rotated in an appropriate direction with the housing 12 being pressed against the door inner panel 3 lightly, the claw portions 13 are inserted into the inserting portions 51 of the slits 5 in a natural fashion.

Consequently, the worker can easily insert the claw portions 13 provided on the rear side 12b of the housing 12 of the speaker unit 1 into the slits 5 formed in the door inner panel 3.

In addition, in the event that this insertion guide 29 is made to function as a waterproofing cover, since the number of components can be reduced, the production costs of housings 12 can be suppressed. Moreover, the number of man-hours required for the production of housings 12 can be reduced to thereby reduce time required for the production.

In this state, the lower cushion 2 as shown in FIG. 7 is compressed between the rear side 12b of the housing 12 and the front side 3a of the door inner panel 3. Namely, the surfaces 13c of the claw portions and the door inner panel 3b are brought into press adhesion to each other by virtue of the restoring force of the lower cushion so compressed.

While the work is expected to rotate the speaker unit 1 of the rotational locking type relative to the door inner panel 3 in the clockwise direction as shown in FIG. 10, it is normally difficult to rotate the speaker unit 1 due to the frictional force generated between the lower cushion 2 and the rear side 3b of the door inner panel 3.

According to the invention, however, the rib 45 having the substantially triangular cross section is provided on the rear side 12b of the housing 12 along the full circumference of the housing 12, and the lower cushion 2 is strongly pressed against the door inner panel 3 only by the portion of the rear side 12b of the housing 12 in the vicinity of the rib 45, while the lower cushion 2 is weakly pressed against by the other portions of the rear side 12b of the housing 12 than the rib 45. Due to this, the frictional force between the lower cushion 2 and the rear side 3b of the door inner panel 3 is not increased more than required and hence does not interrupt the mounting work of the speaker unit 1.

In addition, since the lower cushion 2 is compressed sufficiently at the portion thereof which corresponds to the rib 45, the ingress of water and dust between the door inner panel 3 and the lower cushion 2, and between the lower cushion 2 and the housing 12 can be prevented in an ensured fashion.

Additionally, as shown in FIG. 17, since the two heights are provided for the surface 13c of the claw portion 13, even in the event that the door panel 3 whose thickness differs for the respective claw portions 13 is used, the speaker unit 1 can be mounted on the door inner panel 3 without altering the specification of the housing 12.

In particular, the door inner panel 3 formed using the tailored blank is effective, and even when mounting the speaker unit 1 on the door inner panel of this kind, the worker does not have to pay attention to thickness of the door inner panel 3 but only has to carry out the mounting work of the speaker unit 1 using the housing 12 of the single kind, this contributing the enhancement of the workability.

Then, the worker rotates the speaker unit 1 relative to the door inner panel 3 to mount the former on the latter. In this case, as shown in FIG. 12, the worker inserts the screwdriver 106 from the outer circumferential surface 12c of the housing 12 into the working recess 20 and then the jig fitting hole 30 provided in the inner part of the working recess 20.

Thereafter, the torque T1 is generated relative to the vicinity of the protruding member 34 on the housing 12 by applying the force F1 to the rear end portion 106c of the screwdriver 106. Then, the housing 12 is rotated about the housing center O in the clockwise direction as indicated by the arrow R2 in FIG. 10.

Namely, since the worker can rotate the housing 12 of the speaker unit 1 with the small force F1, the workability in mounting the speaker unit 1 is enhanced.

In addition, in this case, substantially the same effect can be obtained even if the housing 12 is rotated not with the general tool such as the screwdriver 106 but with the special tool 50 as shown in FIG. 16.

Additionally, in the invention, since the aforesaid frictional force is reduced appropriately by providing the minute irregularities on the surfaces 13c of the claw portions 13, the generation of abnormal noise can be reduced or prevented which is attributed to the expansion and contraction of the door inner panel 3 and vibrations and shocks generated while the vehicle is running. Note that the irregularities may be formed no on the surfaces 13c of the claw portions 13 but on the rear side 3b of the door inner panel 3 with which the surfaces 13c of the claw portions 13 are brought into contact.

In addition, in the invention, as shown in FIGS. 19 and 20, since the third slit 5C in which the claw portion 13 of the housing 12 is fitted can be made to function as the water drain hole, the installation position of the speaker unit 1 on the door inner panel 3 can be lowered to the vicinity of the lower end of the door inner panel 3, whereby the space inside the door (the space denoted by the reference numeral 18a in FIG. 20) can be used effectively.

Additionally, since other devices are rarely installed in the vicinity of the opening 4 in the door interior space 18a shown in FIGS. 19 to 21, the worker does not have to pay attention to avoiding the interference with the devices installed in the door interior space 18a when mounting the speaker unit 1 on the door inner panel 3, and therefore, this can contribute to the enhancement in workability of the speaker unit 1 mounting work.

Note that the invention is not limited to the embodiment and other modifications made thereto but may be implemented in various ways without departing from the spirit and scope of the invention.

For example, the speaker unit 1 is mounted on the panel member 3 so that they are formed into an assembly, which may then be assembled to a frame work of the vehicle body.

In addition, in the embodiment, while the speaker unit 1 is described as being installed in the door of the vehicle, the invention may be applied to a case where the speaker is mounted on the rear parcel shelf. In this case, the rear parcel shelf corresponds to the panel member. Additionally, it goes without saying that the invention can by applied to a case where the speaker is mounted on any other places than the door and the shelf.

Thus, as has been described in detail heretofore, according the in-vehicle speaker rotational mounting structure of the invention, when the general tool such as the screwdriver is inserted into the jig inserting hole with the small force being applied thereto, the speaker housing can be rotated with a large torque.

What is claimed is:

1. An in-vehicle speaker rotational mounting structure comprising:
   a speaker unit having a claw portion and a jig inserting hole; and
   a panel member on which the speaker unit is mounted, the panel member having a slit,
   wherein the claw portion is inserted into the slit and the speaker unit is rotated in a circumferential direction by using the jig inserting hole so as to mount the speaker unit on the panel member of the vehicle.

2. The in-vehicle speaker rotational mounting structure as set forth in claim 1, wherein the jig inserting hole is provided in the circumference of the speaker unit.

3. The in-vehicle speaker rotational mounting structure as set forth in claim 2, wherein the jig inserting hole is formed in a inner part of a working recess in which a finger is insertable.

4. The in-vehicle speaker rotational mounting structure as set forth in claim 2, wherein a protruding member protruding radially outwardly is provided on an edge of an opening of the jig inserting hole, the edge is located on a rotational mounting direction side of the opening.

5. The in-vehicle speaker rotational mounting structure as set forth in claim 2, wherein the jig inserting hole has a first side wall provided on a rotational removing direction side thereof and a second side wall provided on a rotational mounting direction side thereof, and
   a protruding portion is provided on the first side wall, which protrudes toward the second side wall so as to lock a distal end of a tool.

6. The in-vehicle speaker rotational mounting structure as set forth in claim 5, wherein the protruding portion comprises a side wall opposed to the second side wall and substantially parallel with the second side wall.

7. The in-vehicle speaker rotational mounting structure as set forth in claim 2, wherein the jig inserting hole has a first side wall provided on a rotational removing direction side thereof and a second side wall provided on a rotational mounting direction side thereof, and
   an imaginary extension of the second side wall is offset relative to a center of the speaker unit.

8. The in-vehicle speaker rotational mounting structure as set forth in claim 2, wherein the jig inserting hole has a mounting jig inserting hole for use in mounting the speaker unit on the panel member and a removing jig inserting hole for use in removing the speaker unit from the panel member, and
   a protruding member protruding radially outwardly is provided on an edge of an opening of the removing jig inserting hole, the edge is located on a rotational removing direction side.

9. The in-vehicle speaker rotational mounting structure as set forth in claim 8, wherein the removing jig inserting hole has a third side wall provided on the rotational removing direction side thereof and a fourth side wall provided on a rotational mounting direction side thereof, and
   a protruding portion is provided on the fourth side wall which protrudes toward the third side wall so as to lock a distal end of a tool.

10. The in-vehicle speaker rotational mounting structure as set forth in claim 9, wherein the protruding portion comprises a side wall opposed to the third side wall and substantially parallel with the third side wall.

11. The in-vehicle speaker rotational mounting structure as set forth in claim 2, wherein the jig inserting hole is provided at two locations which are positioned substantially symmetrically with each other relative to a rotational center of the speaker unit.

12. The in-vehicle speaker rotational mounting structure as set forth in claim 2, wherein the jig inserting hole has a mounting jig inserting hole for use in mounting the speaker unit on the panel member and a removing jig inserting hole for use in removing the speaker unit from the panel member, and
   the mounting jig inserting hole and the removing jig inserting hole are disposed adjacent to each other.

13. The in-vehicle speaker rotational mounting structure as set forth in claim 12, wherein the mounting jig inserting hole is provided at two locations which are positioned substantially symmetrical with each other relative to the rotational center of the speaker unit, and
   the removing jig inserting hole is provided at two locations which are positioned substantially symmetrical with each other relative to the rotational center of the speaker unit.

14. An in vehicle speaker rotational mounting structure comprising:
   a speaker unit having a claw portion;
   a panel member on which the speaker unit is mounted;
   a first slit portion formed in the panel member for insertion of the claw portion;
   a second slit portion provided continuously from the first slit portion in a circumferential direction and having an engagement portion where the claw portion and the panel member are brought into engagement with each other; and
   a recess provided in a circumference of the speaker unit,
   wherein a jig is inserted into the recess so as to rotate the speaker unit therewith from a first position where the claw portion is positioned in the first slit portion to a second position where the claw portion is positioned in the second slit portion to thereby fix the speaker unit to the panel member of the vehicle.

* * * * *